(12) United States Patent
Beason et al.

(10) Patent No.: US 11,867,023 B2
(45) Date of Patent: *Jan. 9, 2024

(54) INTELLIGENTLY CONTROLLED FLUID SYSTEMS

(71) Applicant: Downing Wellhead Equipment, LLC, Oklahoma City, OK (US)

(72) Inventors: Ronnie B. Beason, Lexington, OK (US); Nicholas J. Cannon, Washington, OK (US)

(73) Assignee: DOWNING WELLHEAD EQUIPMENT, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,854

(22) Filed: May 13, 2021

(65) Prior Publication Data

US 2021/0262315 A1 Aug. 26, 2021

Related U.S. Application Data

(63) Continuation-in-part of application No. 16/855,749, filed on Apr. 22, 2020, now Pat. No. 11,480,027,
(Continued)

(51) Int. Cl.
*E21B 34/02* (2006.01)
*E21B 33/03* (2006.01)
(Continued)

(52) U.S. Cl.
CPC ............ *E21B 34/02* (2013.01); *E21B 17/006* (2013.01); *E21B 33/068* (2013.01); *E21B 41/00* (2013.01);
(Continued)

(58) Field of Classification Search
CPC ...... E21B 43/26; E21B 43/2604; E21B 34/02; E21B 33/03
See application file for complete search history.

(56) References Cited

U.S. PATENT DOCUMENTS 5,341,835 A 8/1994 Lanning, II
9,068,450 B2 6/2015 Guidry
(Continued)

OTHER PUBLICATIONS

International Search Report and the Written Opinion for corresponding International Application No. PCT/US20/29358, dated Jul. 23, 2020; 18 pages.
(Continued)

*Primary Examiner* — Giovanna Wright
(74) *Attorney, Agent, or Firm* — HAYNES AND BOONE, LLP

(57) ABSTRACT

A system and methods according to which a controller communicates control signals to a first frac leg, which includes a wellhead operably associated with a first wellbore, a valve operably coupled to the wellhead, opposite the first wellbore, a frac line operably coupled to the wellhead, and a zipper module operably coupled to the frac line, opposite the wellhead. The first frac leg includes a first sub-controller that receives control signals from the controller. A grease system lubricates the first frac leg and the zipper module. The grease system includes a second sub-controller that receives control signals from the controller. A second frac leg is operably associated with a second wellbore. The second frac leg includes a third sub-controller that receives control signals from the controller. The first, second, and/or third sub-controllers may receive control signals from the controller via a communication bus.

28 Claims, 21 Drawing Sheets

Related U.S. Application Data which is a continuation-in-part of application No. 16/803,156, filed on Feb. 27, 2020, now Pat. No. 11,242,724, which is a continuation-in-part of application No. 16/436,623, filed on Jun. 10, 2019, now Pat. No. 11,208,856, said application No. 16/803,156 is a continuation-in-part of application No. 16/248,633, filed on Jan. 15, 2019, now Pat. No. 10,584,552, said application No. 16/855,749 is a continuation-in-part of application No. 16/248,648, filed on Jan. 15, 2019, now Pat. No. 10,724,682, said application No. 16/803,156 is a continuation-in-part of application No. 16/100,741, filed on Aug. 10, 2018, now Pat. No. 10,689,938.

(60) Provisional application No. 62/836,761, filed on Apr. 22, 2019, provisional application No. 62/755,170, filed on Nov. 2, 2018, provisional application No. 62/638,688, filed on Mar. 5, 2018, provisional application No. 62/638,681, filed on Mar. 5, 2018, provisional application No. 62/637,220, filed on Mar. 1, 2018, provisional application No. 62/637,215, filed on Mar. 1, 2018, provisional application No. 62/617,438, filed on Jan. 15, 2018, provisional application No. 62/617,443, filed on Jan. 15, 2018, provisional application No. 62/598,914, filed on Dec. 14, 2017.

(51) Int. Cl.
| | | |
|---|---|---|
| *E21B 41/00* | (2006.01) | |
| *E21B 43/26* | (2006.01) | |
| *E21B 33/068* | (2006.01) | |
| *F16N 11/00* | (2006.01) | |
| *F16N 29/02* | (2006.01) | |
| *F16K 3/36* | (2006.01) | |
| *E21B 43/11* | (2006.01) | |
| *E21B 17/00* | (2006.01) | |

(52) U.S. Cl.
CPC .............. *E21B 43/11* (2013.01); *E21B 43/26* (2013.01); *E21B 43/2607* (2020.05); *F16K 3/36* (2013.01); *F16N 11/00* (2013.01); *F16N 29/02* (2013.01); *F16N 2210/00* (2013.01)

(56) References Cited

U.S. PATENT DOCUMENTS

| | | |
|---|---|---|
| 9,644,443 B1 | 5/2017 | Johansen et al. |
| 10,100,978 B2 | 10/2018 | Gouge |
| 10,260,327 B2 | 4/2019 | Kajaria et al. |
| 10,392,894 B2 | 8/2019 | Kibler et al. |
| 10,513,906 B2 | 12/2019 | Knott |
| 10,662,740 B2 | 5/2020 | Cannon et al. |
| 11,072,995 B2 | 7/2021 | Cannon et al. |
| 2010/0246312 A1 | 9/2010 | Welker et al. |
| 2014/0352968 A1 | 12/2014 | Pitcher et al. |
| 2015/0345272 A1* | 12/2015 | Kajaria ............... E21B 47/00 166/308.1 |
| 2016/0102537 A1 | 4/2016 | Lopez |
| 2018/0073308 A1 | 3/2018 | Tran et al. |
| 2018/0112491 A1 | 4/2018 | Knott |
| 2019/0032439 A1* | 1/2019 | Smith .................. E21B 19/008 |
| 2021/0262315 A1 | 8/2021 | Beason et al. |
| 2021/0324706 A1* | 10/2021 | Beason ..................... F16N 7/38 |

OTHER PUBLICATIONS

Non-Final Office Action for U.S. Appl. No. 17/360,336, dated Feb. 2, 2022; 14 pages.

Final Office Action for U.S. Appl. No. 17/360,336, dated May 11, 2022; 12 pages.

\* cited by examiner

440

DELIVERING GREASE TO A FIRST ONE OF THE METERING MODULES $320_{1-N}$ ⸺ 445

CONTROLLING, USING THE CONTROLLER 180, THE ACTUATOR OF THE FIRST ONE OF THE METERING MODULES $320_{1-N}$ SO THAT A FIRST AMOUNT OF THE DELIVERED GREASE IS METERED TO A FIRST ONE OF THE PROCESS VALVES $310_{1-N}$ ⸺ 450

DELIVERING GREASE TO A SECOND ONE OF THE METERING MODULES $320_{1-N}$ ⸺ 455

CONTROLLING, USING THE CONTROLLER 180, THE ACTUATOR OF THE SECOND ONE OF THE METERING MODULES $320_{1-N}$ SO THAT A SECOND AMOUNT OF THE DELIVERED GREASE IS METERED TO A SECOND ONE OF THE PROCESS VALVES $310_{1-N}$ ⸺ 460

Figure 13

INTELLIGENTLY CONTROLLED FLUID SYSTEMS

CROSS-REFERENCE TO RELATED APPLICATIONS

This application is a continuation-in-part (CIP) of U.S. patent application Ser. No. 16/855,749 (the "'749 application"), filed Apr. 22, 2020, the entire disclosure of which is hereby incorporated herein by reference. The '749 application claims the benefit of the filing date of, and priority to, U.S. Patent Application No. 62/836,761, filed Apr. 22, 2019, the entire disclosure of which is hereby incorporated herein by reference.

The '749 application is a continuation-in-part (CIP) of U.S. patent application Ser. No. 16/248,648 (the "'648 application"), filed Jan. 15, 2019, now issued as U.S. Pat. No. 10,724,682, the entire disclosure of which is hereby incorporated herein by reference. The '648 application claims the benefit of the filing date of, and priority to, U.S. Application No. 62/617,443, filed Jan. 15, 2018, the entire disclosure of which is hereby incorporated herein by reference.

The '749 application is also a CIP of U.S. patent application Ser. No. 16/803,156 (the "'156 application"), filed Feb. 27, 2020, the entire disclosure of which is hereby incorporated herein by reference. The '156 application is a CIP of U.S. patent application Ser. No. 16/248,633 (the "'633 application"), filed Jan. 15, 2019, now issued as U.S. Pat. No. 10,584,552, the entire disclosure of which is hereby incorporated herein by reference. The '633 application claims the benefit of the filing date of, and priority to, U.S. Patent Application No. 62/617,438 (the "'438 application"), filed Jan. 15, 2018, the entire disclosure of which is hereby incorporated herein by reference.

The '156 application is also a CIP of U.S. patent application Ser. No. 16/436,623 (the "'623 application"), filed Jun. 10, 2019, the entire disclosure of which is hereby incorporated herein by reference. The '623 application claims the benefit of the filing date of, and priority to, U.S. Patent Application No. 62/755,170, filed Nov. 2, 2018, the entire disclosure of which is hereby incorporated herein by reference.

The '156 application is also a CIP of U.S. patent application Ser. No. 16/100,741 (the "'741 application"), filed Aug. 10, 2018, now issued as U.S. Pat. No. 10,689,938, the entire disclosure of which is hereby incorporated herein by reference. The '741 application claims the benefit of the filing date of, and priority to, U.S. Patent Application No. 62/638,688, filed Mar. 5, 2018, U.S. Patent Application No. 62/638,681, filed Mar. 5, 2018, U.S. Patent Application No. 62/637,220, filed Mar. 1, 2018, U.S. Patent Application No. 62/637,215, filed Mar. 1, 2018, and U.S. Patent Application No. 62/598,914, filed Dec. 14, 2017, the entire disclosures of which are hereby incorporated herein by reference.

The '749 application is related to U.S. patent application Ser. No. 16/801,911, filed Feb. 26, 2020, the entire disclosure of which is hereby incorporated herein by reference.

BACKGROUND

The present application is related generally to fluid systems and, more particularly, to intelligently controlled fluid systems used in oil and gas operations.

BRIEF DESCRIPTION OF THE DRAWINGS

FIG. 13 is a flow diagram of a method for implementing one or more embodiments of the present disclosure.

DETAILED DESCRIPTION

Figure 1:
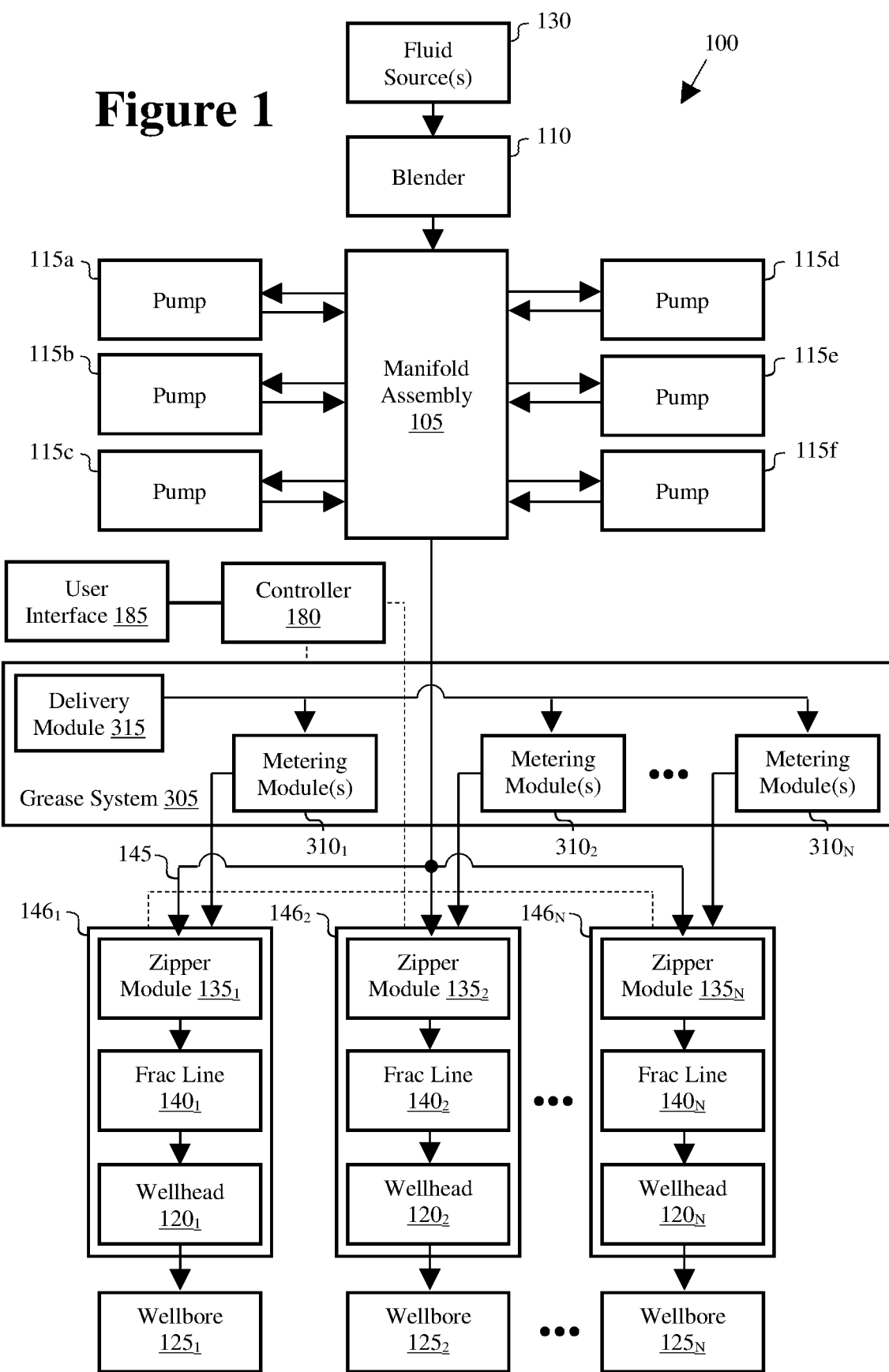
FIG. 1 is a diagrammatic illustration of a system, according to one or more embodiments.

Referring to FIG. 1, in one or more embodiments, a system generally referred to by the reference numeral 100 is diagrammatically illustrated. The system includes a manifold assembly 105 in fluid communication with a blender 110, hydraulic fracturing pumps 115a-f, and wellheads $120_{1-N}$. The wellheads $120_{1-N}$ serve as surface terminations for wellbores $125_{1-N}$, respectively, with the wellheads $120_{1-N}$ being permanently, semi-permanently, or temporarily operably coupled to the wellbores $125_{1-N}$, respectively. The system 100 includes one or more fluid sources 130 in fluid communication with the blender 110. The wellheads $120_{1-N}$ are in fluid communication with the manifold assembly 105 via, for example, zipper modules $135_{1-N}$ and fracturing (or "frac") lines $140_{1-N}$. The zipper modules $135_{1-N}$ are operably associated with a zipper manifold 145; for example, the zipper modules $135_{1-N}$ may be interconnected with each other via the zipper manifold 145. In one or more embodiments, the zipper modules $135_{1-N}$ are part of the zipper manifold 145 to which the manifold assembly 105 is operably coupled. In one or more embodiments, the zipper modules $135_{1-N}$ are interconnected. In one or more embodiments, at least one of the zipper modules $135_{1-N}$ is interconnected with at least one other of the zipper modules $135_{1-N}$. The frac lines $140_{1-N}$ couple the zipper modules $135_{1-N}$, respectively, to the wellheads $120_{1-N}$, respectively. In one or more embodiments, the frac lines $140_{1-N}$ are part of the zipper manifold 145. The wellhead $120_1$, the zipper module $135_1$, and the frac line $140_1$, in combination, form a frac leg $146_1$. Similarly, respective sets of the wellheads $120_{2-N}$, the zipper modules $135_{2-N}$, and the frac line $140_{2-N}$, in combination, form frac legs $146_{2-N}$.

Referring still to FIG. 1, a system for delivering and metering grease to the frac legs $146_{1-N}$ is diagrammatically illustrated and generally referred to by the reference numeral 305. In one or more embodiments, the grease 305 is, included, or is part of, the grease system described in the '648 application. For example, the frac legs $146_{1-N}$ may include process valves to which the grease system 100 delivers and meters grease, as will be described in more detail below. In one or more embodiments, such process valves are gate valves. The grease system 305 includes a delivery module 315 and metering modules $320_{1-N}$. The metering modules $320_{1-N}$ are each operably associated with, and adapted to be in communication with, the delivery module 315. Likewise, the process valves of the frac legs $146_{1-N}$ are operably associated with, and adapted to be in communication with, the metering modules $320_{1-N}$, respectively. In operation, to grease the process valves of the frac legs $146_{1-N}$, the metering modules $320_{1-N}$ are adapted to force grease from the delivery module 315 into the respective process valves, as will be described in more detail below. In one or more embodiments, as in FIG. 1, a controller 180 is adapted to send control signals to the grease system 305 and the frac legs $146_{1-N}$, as will be described in more detail below. A user interface 185 is operably coupled to the controller 180 to enable a user to monitor and control the grease system 305 and the frac legs $146_{1-N}$, as will be described in more detail below.

In one or more embodiments, the system 100 and/or the grease system 305 are part of a hydraulic fracturing system, which may be used to facilitate oil and gas exploration and production operations. For example, the system 100 and/or the grease system 305 may be adapted to perform a hydraulic fracturing operation on one or more of the wellbores $125_{1-N}$. The embodiments provided herein are not, however, limited to a hydraulic fracturing system, as the system 100 may be used with, or adapted to, a mud pump system, a well treatment system, other pumping systems, one or more systems at the wellheads $120_{1-N}$, one or more systems upstream of the wellheads $120_{1-N}$, one or more systems downstream of the wellheads $120_{1-N}$, and/or one or more other systems associated with the wellheads $120_{1-N}$.

Figure 2:
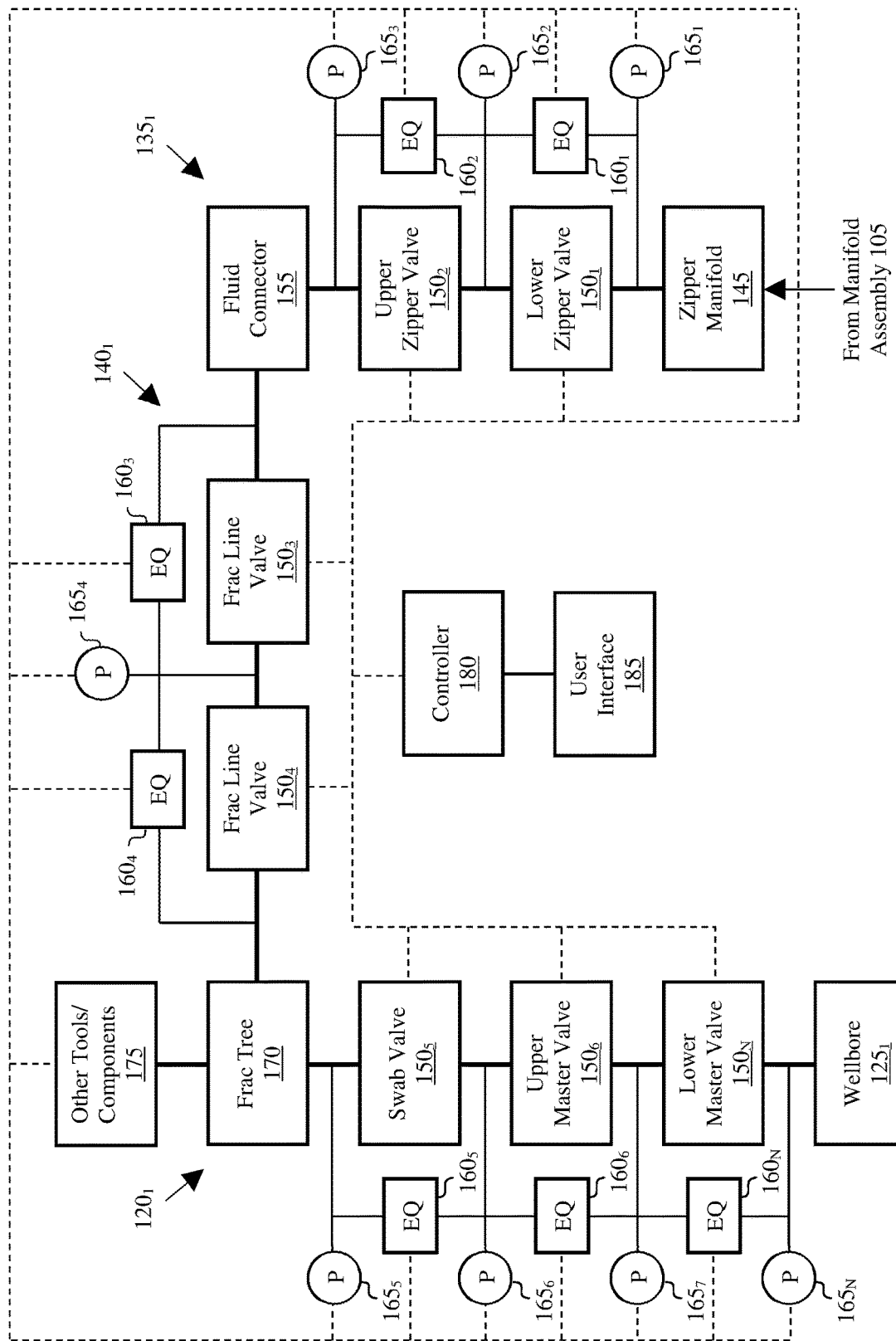
FIG. 2 is a diagrammatic illustration of a zipper module, a fracturing (or "frac") line, and a wellhead of the system of FIG. 1, according to one or more embodiments.

Referring to FIG. 2, with continuing reference to FIG. 1, the zipper module $135_1$, the frac line $140_1$, and the wellhead $120_1$ are diagrammatically illustrated in detail. In one or more embodiments, the zipper module $135_1$ includes a lower zipper valve $150_1$, an upper zipper valve $150_2$, and a fluid connector 155. The lower zipper valve $150_1$ is operably coupled to the zipper manifold 145. The upper zipper valve $150_2$ is operably coupled to the lower zipper valve $150_1$ opposite the zipper manifold 145. The fluid connector 155 is operably coupled to the upper zipper valve $150_2$ opposite the lower zipper valve $150_1$. An equalization valve $160_1$ is in fluid communication with inlet and outlet sides of the lower zipper valve $150_1$. A pressure sensor $165_1$ is in fluid communication with the inlet side of the lower zipper valve $150_1$. A pressure sensor $165_2$ is in fluid communication with the outlet side of the lower zipper valve $150_1$. Similarly, an equalization valve $160_2$ is in fluid communication with inlet and outlet sides of the upper zipper valve $150_2$. A pressure sensor such as, for example, the pressure sensor $165_2$ is in fluid communication with the inlet side of the upper zipper valve $150_2$. A pressure sensor $165_3$ is in fluid communication with the outlet side of the upper zipper valve $150_2$.

In one or more embodiments, the frac line $140_1$ includes frac line valves $150_3$ and $150_4$. The frac line valve $150_3$ is operably coupled to the fluid connector 155 of the zipper module $135_1$. The frac line valve $150_4$ is operably coupled to the frac line valve $150_3$ opposite the fluid connector 155. The frac line $140_1$ is operably coupled between the zipper module $135_1$ and the wellhead $120_1$. An equalization valve $160_3$ is in fluid communication with inlet and outlet sides of the frac line valve $150_3$. A pressure sensor such as, for example, the pressure sensor $165_3$ is in fluid communication with the inlet side of the frac line valve $150_3$. A pressure sensor $165_4$ is in fluid communication with the outlet side of the frac line valve $150_3$. Similarly, an equalization valve $160_4$ is in fluid communication with inlet and outlet sides of the frac line valve $150_4$. A pressure sensor such as, for example, the pressure sensor $165_4$ is in fluid communication with the inlet side of the frac line valve $150_4$. A pressure sensor $165_5$ is in fluid communication with the outlet side of the frac line valve $150_4$.

In one or more embodiments, the wellhead $120_1$ includes a frac tree 170, a swab valve $150_5$, and upper master valve $150_6$, and a lower master valve $150_N$. An inlet side of the lower master valve $150_N$ is in fluid communication with the wellbore $125_1$. The upper master valve $150_6$ is operably coupled to the lower master valve $150_N$ opposite the wellbore $125_1$. The swab valve $150_5$ is operably coupled to the upper master valve $150_6$ opposite the lower master valve $150_N$. The frac tree 170 is operably coupled to the swab valve $150_5$ opposite the upper master valve $150_6$. Alternatively, the frac tree 170 may be operably coupled to the upper master valve $150_6$ opposite the lower master valve $150_N$, and the swab valve $150_5$ may be operably coupled to the frac tree 170 opposite the upper master valve $150_6$. The frac line $140_1$ is operably coupled, via the frac tree 170, to the wellhead $120_1$. In one or more embodiments, the frac tree 170 is or includes a goat head; in at least one such embodiment, the frac line $140_1$ and one or more additional frac lines substantially similar to the frac line $140_1$ are operably coupled between the zipper module $135_1$ and the goat head so that fluid is communicable from the zipper module $135_1$ to the wellhead $120_1$ through the frac line $140_1$ and the one or more additional frac lines.

In addition, the wellhead $120_1$ may include one or more other wellhead tools or components 175 such as, for example: one or more wing valves; a tree cap; a tree cap valve; the valve apparatus described in U.S. patent application Ser. No. 15/487,785 (the "'785 application"), filed Apr. 14, 2017, and published Oct. 19, 2017 as U.S. Publication No. 2017/0298708, the entire disclosure of which is hereby incorporated herein by reference; the valve apparatus described in U.S. patent application Ser. No. 16/721,203 (the "'203 application"), filed Dec. 19, 2019, the entire disclosure of which is hereby incorporated herein by reference; the object launching apparatus described in the '633 application; or any combination thereof. One or more embodiments of the one or more other wellhead tools or components 175 are described in further detail below. Although shown as being operably coupled to the frac tree 170 opposite the swab valve $150_5$, the one or more other wellhead tools or components 175 may instead be positioned at any location in the wellhead $120_1$ such as, for example, between the wellbore $125_1$ and the lower master valve $150_N$, between the lower master valve $150_N$ and the upper master valve $150_6$, between the upper master valve $150_6$ and the swab valve $150_5$, between the upper master valve $150_6$ and the frac tree 170, between the frac tree 170 and the swab valve $150_5$, or any combination thereof.

An equalization valve $160_5$ is in fluid communication with inlet and outlet sides of the swab valve $150_5$. A pressure sensor such as, for example, the pressure sensor $165_5$ is in fluid communication with the inlet side of the swab valve $150_5$. A pressure sensor $165_6$ is in fluid communication with the outlet side of the swab valve $150_5$. Similarly, an equalization valve $160_6$ is in fluid communication with inlet and outlet sides of the upper master valve $150_6$. A pressure sensor such as, for example, the pressure sensor $165_6$ is in fluid communication with the inlet side of the upper master valve $150_6$. A pressure sensor $165_7$ is in fluid communication with the outlet side of the upper master valve $150_6$. Similarly, an equalization valve $160_N$ is in fluid communication with inlet and outlet sides of the lower master valve $150_N$. A pressure sensor such as, for example, the pressure sensor $165_7$ is in fluid communication with the inlet side of the lower master valve $150_N$. A pressure sensor $165_N$ is in fluid communication with the outlet side of the lower master valve $150_N$.

In one or more embodiments, one or more of the pressure sensors $165_{1-N}$ includes a bladder or other mechanical buffer to protect the pressure sensor(s) $165_{1-N}$ from erosions/washout and/or to prevent the pressure sensor(s) $165_{1-N}$ from plugging off and trapping pressure; in such embodiments, the bladder of other mechanical buffer prevents, or at least reduces, inaccurate readings of line pressure by the pressure sensor(s) $165_{1-N}$ due to sand or grease plugging process port(s) of the pressure sensor(s) $165_{1-N}$.

In one or more embodiments, one or more of the equalization valves $160_{1-N}$ is designed to be resistant to washout and/or abrasive damage to the valve member(s) $215_{1-N}$ (shown in FIG. 4); accordingly, the equalization valves $160_{1-N}$ may incorporate internal materials such as, for example, Stellite, engineered ceramic, Zirconia, or the like to enhance durability and resistance to washout/erosion and to prevent, or at least reduce, sealing issues.

Although the terms "inlet" and "outlet" used herein may imply a direction of fluid flow from the zipper manifold 145 to the zipper module $135_1$, from the zipper module $135_1$ to the frac line $140_1$, from the frac line $140_1$ to the wellhead $120_1$, and/or from the wellhead $120_1$ to the wellbore $125_1$, it should be understood that, depending on relative fluid pressures within the system 100, fluid may instead flow in the opposite direction, that is, from the wellbore $125_1$ to the wellhead $120_1$, from the wellhead $120_1$ to the frac line $140_1$, from the frac line $140_1$ to the zipper module $135_1$, and/or from the zipper module to the zipper manifold 145. Accordingly, the term "inlet" may refer to an "outlet" and the term "outlet" may refer to an "inlet."

The controller 180 is operably coupled to, and adapted to control, the lower zipper valve $150_1$, the equalization valve $160_1$, the upper zipper valve $150_2$, the equalization valve $160_2$, the frac line valve $150_3$, the equalization valve $160_3$, the frac line valve $150_4$, the equalization valve $160_4$, the swab valve $150_5$, the equalization valve $160_5$, the upper master valve $150_6$, the equalization valve $160_6$, the lower master valve $150_N$, and the equalization valve $160_N$, as will be described in more detail below. Further, the controller 180 is operably coupled to, and adapted to monitor, one or more of the pressure sensors $165_{1-N}$, that is, the controller 180 is adapted to receive signal(s) from one or more of the pressure sensors $165_{1-N}$, as will be described in more detail below. Further still, the controller 180 is operably coupled to, and adapted to control, the one or more other wellhead tools or components 175, as will be described in further detail below. The user interface 185 is operably coupled to the controller 180 to enable a user to monitor and control the zipper module $135_1$, the frac line $140_1$, and the wellhead $120_1$, as will be described in more detail below.

Figure 3:
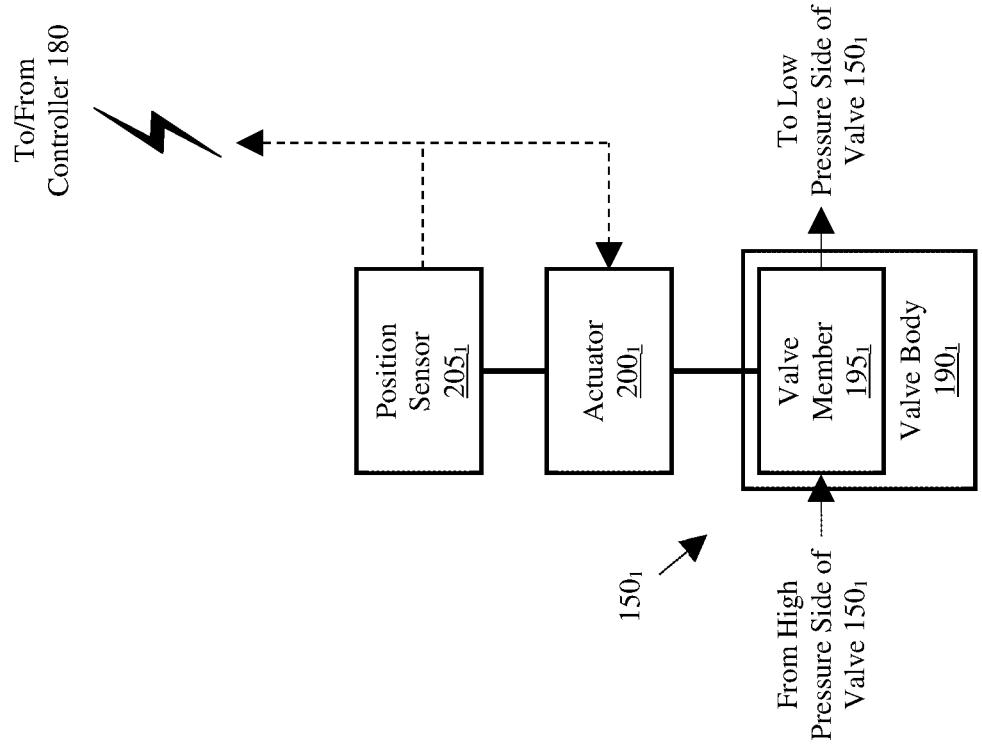
FIG. 3 is a diagrammatic illustration of a lower zipper valve of the zipper module of FIG. 2, according to one or more embodiments.

Referring to FIG. 3, with continuing reference to FIG. 2, the lower zipper valve $150_1$ is diagrammatically illustrated in detail. In one or more embodiments, the lower zipper valve $150_1$ includes a valve body $190_1$ and a valve member $195_1$. The valve member $195_1$ extends within the valve body $190_1$ and is actuable between an open configuration and a closed configuration. In the open configuration, the valve member $195_1$ permits fluid flow through the valve body $190_1$ from a high-pressure side (i.e., one of the inlet side or the outlet side of the of the lower zipper valve $150_1$) to a low-pressure side (i.e., the other of the inlet side or the outlet side of the of the lower zipper valve $150_1$) of the lower zipper valve $150_1$, as shown in FIG. 3. In the closed configuration, the valve member $195_1$ prevents, or at least partially restricts, fluid flow through the valve body $190_1$ from the high-pressure side to the low-pressure side of the lower zipper valve $150_1$. An actuator $200_1$ is operably coupled to the valve member $195_1$ to actuate the valve member $195_1$ within the valve body $190_1$ between the open configuration and the closed configuration. The controller 180 is operably coupled to, and adapted to control, the actuator $200_1$. In addition to, or instead of, the actuator $200_1$ being controlled by the controller 180, the actuator $200_1$ may be or include a manual actuator that is manually controllable/actuable by an operator (e.g., via hydraulic, electric over hydraulic, or other mechanisms). A position sensor $205_1$ is operably coupled to the actuator $200_1$ to detect a position and/or an orientation of the valve member $195_1$ relative to the valve body $190_1$. In addition, or instead, the position sensor $205_1$ may be operably coupled to the valve member $195_1$ and/or the valve body $190_1$. The controller 180 is operably coupled to, and adapted to monitor, the position sensor $205_1$, that is, the controller 180 is adapted to receive signal(s) from the position sensor $205_1$. In one or more embodiments, the feedback provided by the position sensor $205_1$ is analog (i.e., continuous 0% to 100% open). In addition, or instead, the position sensor $205_1$ may be or include a switch (e.g., having minimum resolutions of 0%, 50%, and 100% open).

In one or more embodiments, the upper zipper valve $150_2$, the frac line valve $150_3$, the frac line valve $150_4$, the swab valve $150_5$, the upper master valve $150_6$, and the lower master valve $150_N$ are substantially similar to, and operate in substantially the same manner as, the lower zipper valve $150_1$; therefore, the structure and operation of the upper zipper valve $150_2$, the frac line valve $150_3$, the frac line valve $150_4$, the swab valve $150_5$, the upper master valve $150_6$, and the lower master valve $150_N$ will not be described in more detail. Moreover, the various components of each of the upper zipper valve $150_2$, the frac line valve $150_3$, the frac line valve $150_4$, the swab valve $150_5$, the upper master valve $150_6$, and the lower master valve $150_N$ may be identified hereinbelow using the same reference numerals as those associated with corresponding components of the lower zipper valve $150_1$ (as set forth above and shown in FIG. 3), except that, rather than the subscript "1" used to identify the components of the lower zipper valve $150_1$, subscripts "2", "3", "4", "5", "6", and "N" are used to identify the corresponding components of the upper zipper valve $150_2$, the frac line valve $150_3$, the frac line valve $150_4$, the swab valve $150_5$, the upper master valve $150_6$, and the lower master valve $150_N$, respectively.

Figure 4:
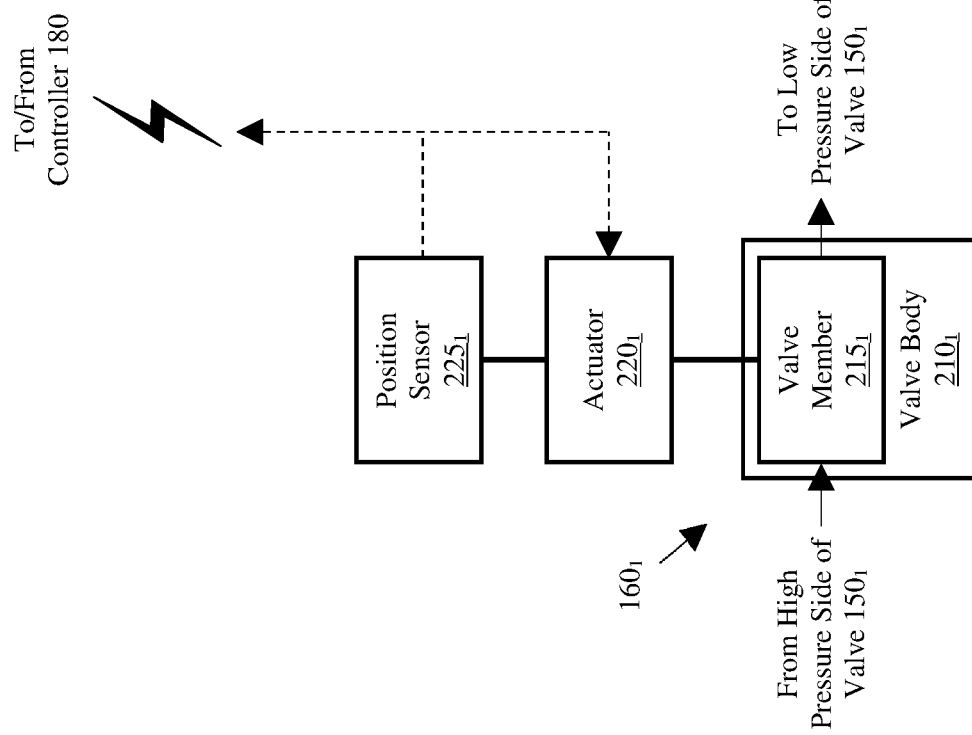
FIG. 4 is a diagrammatic illustration of an equalization valve of the system of FIG. 2, said equalization valve being operably associated with the valve of FIG. 3, according to one or more embodiments.

Referring to FIG. 4, with continuing reference to FIG. 2, the equalization valve $160_1$ is diagrammatically illustrated in detail. As discussed above, the equalization valve $160_1$ is in fluid communication with the inlet and outlet sides of the lower zipper valve $150_1$. In one or more embodiments, the equalization valve $160_1$ includes a valve body $210_1$ and a valve member $215_1$. The valve member $215_1$ extends within the valve body $210_1$ and is actuable between an open configuration and a closed configuration. In the open configuration, the valve member $215_1$ permits fluid flow through the valve body $210_1$ from a high-pressure side (i.e., one of the inlet side or the outlet side of the of the lower zipper valve $150_1$) to a low-pressure side (i.e., the other of the inlet side or the outlet side of the lower zipper valve $150_1$) of the lower zipper valve $150_1$, as shown in FIG. 4. In the closed configuration, the valve member $215_1$ prevents, or at least partially restricts, fluid flow through the valve body $210_1$ from the high-pressure side to the low-pressure side of the lower zipper valve $150_1$. An actuator $220_1$ is operably coupled to the valve member $215_1$ to actuate the valve member $215_1$ within the valve body $210_1$ between the open configuration and the closed configuration. The controller 180 is operably coupled to, and adapted to control, the actuator $220_1$. In addition to, or instead of, the actuator $220_1$ being controlled by the controller 180, the actuator $220_1$ may be or include a manual actuator that is manually controllable/actuable by an operator (e.g., via hydraulic, electric over hydraulic, or other mechanisms). A position sensor $225_1$ is operably coupled to the actuator $220_1$ to detect a position and/or an orientation of the valve member $215_1$ relative to the valve body $210_1$. In addition, or instead, the position sensor $225_1$ may be operably coupled to the valve member $215_1$ and/or the valve body $210_1$. The controller 180 is operably coupled to, and adapted to monitor, the position sensor $225_1$, that is, the controller 180 is adapted to receive signal(s) from the position sensor $225_1$. In one or more embodiments, the feedback provided by the position sensor $225_1$ is analog (i.e., continuous 0% to 100% open). In addition, or instead, the position sensor $225_1$ may be or include a switch (e.g., having minimum resolutions of 0%, 50%, and 100% open).

In one or more embodiments, the equalization valves $160_{2-N}$ are substantially similar to, and operate in substantially the same manner as, the equalization valve $160_1$; therefore, the structure and operation of the equalization valves $160_{2-N}$ will not be described in more detail. Moreover, the various components of each of the equalization valves $160_{2-N}$ may be identified hereinbelow using the same reference numerals as those associated with corresponding components of the equalization valve $160_1$ (as set forth above and shown in FIG. 4), except that, rather than the subscript "1" used to identify the components of the equalization valve $160_1$, subscripts "2", "3", "4", "5", "6", and "N" are used to identify the corresponding components of the equalization valves $160_{2-N}$, respectively.

Figure 5:
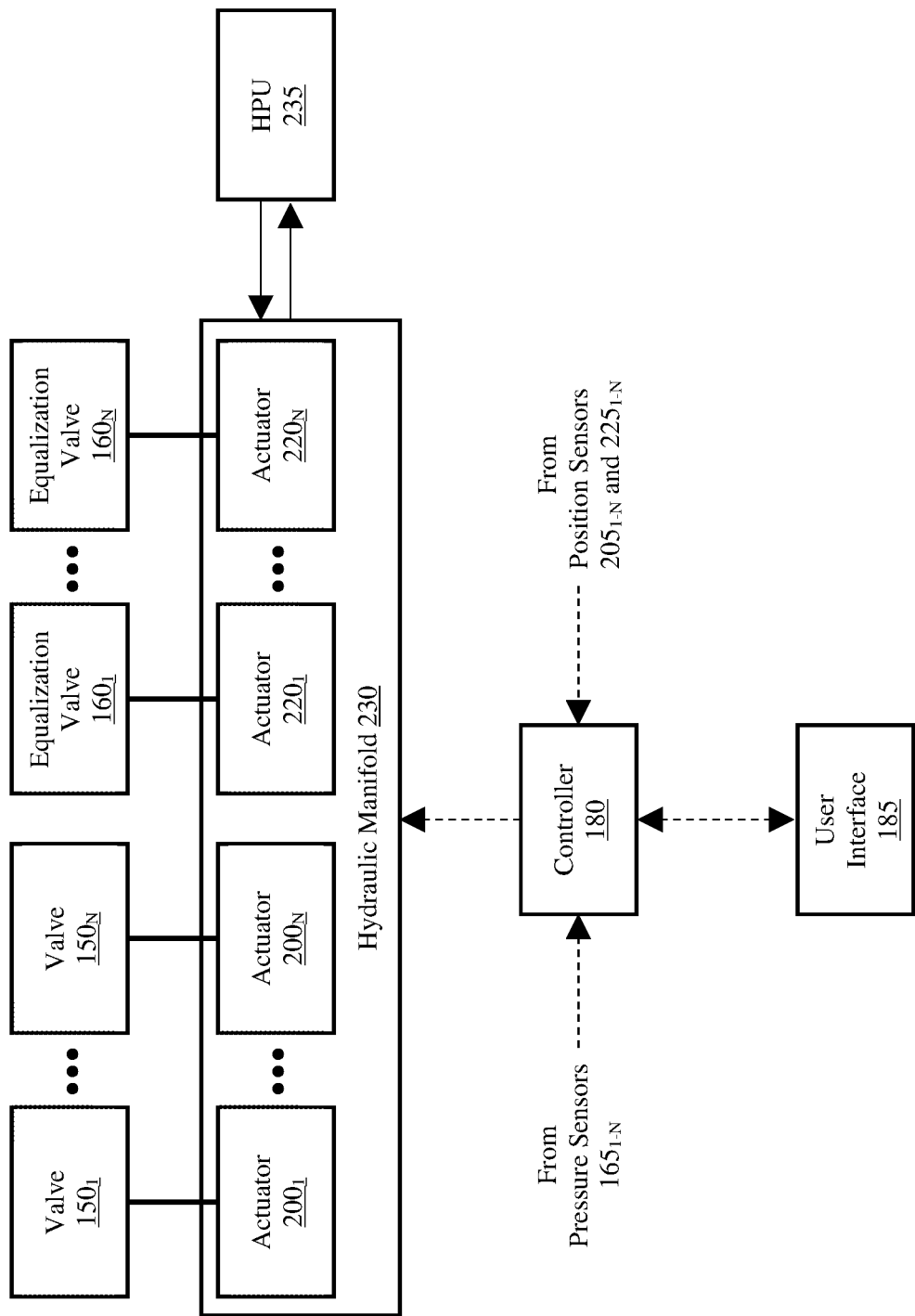
FIG. 5 is a diagrammatic illustration of a hydraulic manifold configured to actuate the valve of FIG. 3, one or more other valves similar to said valve, the equalization valve of FIG. 4, and one or more other valves similar to said equalization valve, according to one or more embodiments.

Referring to FIG. 5, with continuing reference to FIGS. 2-4, a hydraulic manifold 230 operably associated with the actuators $200_{1-N}$ and $220_{1-N}$ is illustrated in detail. More particularly, the hydraulic manifold 230 is operably coupled to the actuators $200_{1-N}$ of the valves $150_{1-N}$, respectively, and to the actuators $220_{1-N}$ of the equalization valves $160_{1-N}$, respectively. The hydraulic manifold 230 facilitates actuation of the actuators $200_{1-N}$ and $220_{1-N}$. A hydraulic power unit (or "HPU") 235 is operably coupled to the hydraulic manifold 230 and adapted to provide hydraulic fluid to, and to receive hydraulic fluid from, the hydraulic manifold 230. In one or more embodiments, to facilitate the communication of hydraulic fluid between the HPU 235 and the hydraulic manifold 230, the HPU 235 includes a reservoir, a hydraulic pump, and a motor. The controller 180 is operably coupled to, and adapted to control, the hydraulic manifold 230. Specifically, the controller 180 is adapted to actuate, via the hydraulic manifold 230, one or more of the actuators $200_{1-N}$ and/or $220_{1-N}$ based at least partially on data/readings received from the pressure sensors $165_{1-N}$, the position sensors $205_{1-N}$, and/or the position sensors $225_{1-N}$, as will be described in more detail below. The user interface 185 is operably coupled to the controller 180 and enables a user to modify one or more parameters associated with the controller 180's actuation of the one or more of the actuators $200_{1-N}$ and/or $220_{1-N}$ via the hydraulic manifold 230. In one or more embodiments, the user interface 185 enables a user to take manual control of the controller 180's actuation of the one or more of the actuators $200_{1-N}$ and/or $220_{1-N}$. In one or more embodiments, the controller 180 may also be operably coupled to, and adapted to control, the HPU 235.

In one or more embodiments, the system 100 is used to perform a hydraulic fracturing operation. Prior to said hydraulic fracturing operation: the swab valve $150_5$, the upper master valve $150_6$, and the lower master valve $150_N$ may be open; the lower zipper valve $150_1$, the upper zipper valve $150_2$, the frac line valve $150_3$, and the frac line valve $150_4$ may be closed; and pressure from the wellbore $125_1$ may be exerted on the frac line valve $150_4$. In such instances, before initiating the hydraulic fracturing operation, the wellbore pressure exerted on the frac line valve $150_4$ must be equalized with a pressure of the pumped hydraulic fracturing fluid, that is, the pressure of the hydraulic fracturing fluid pumped into the manifold assembly 105 by the pumps 115a-f (shown in FIG. 1).

Figure 6:
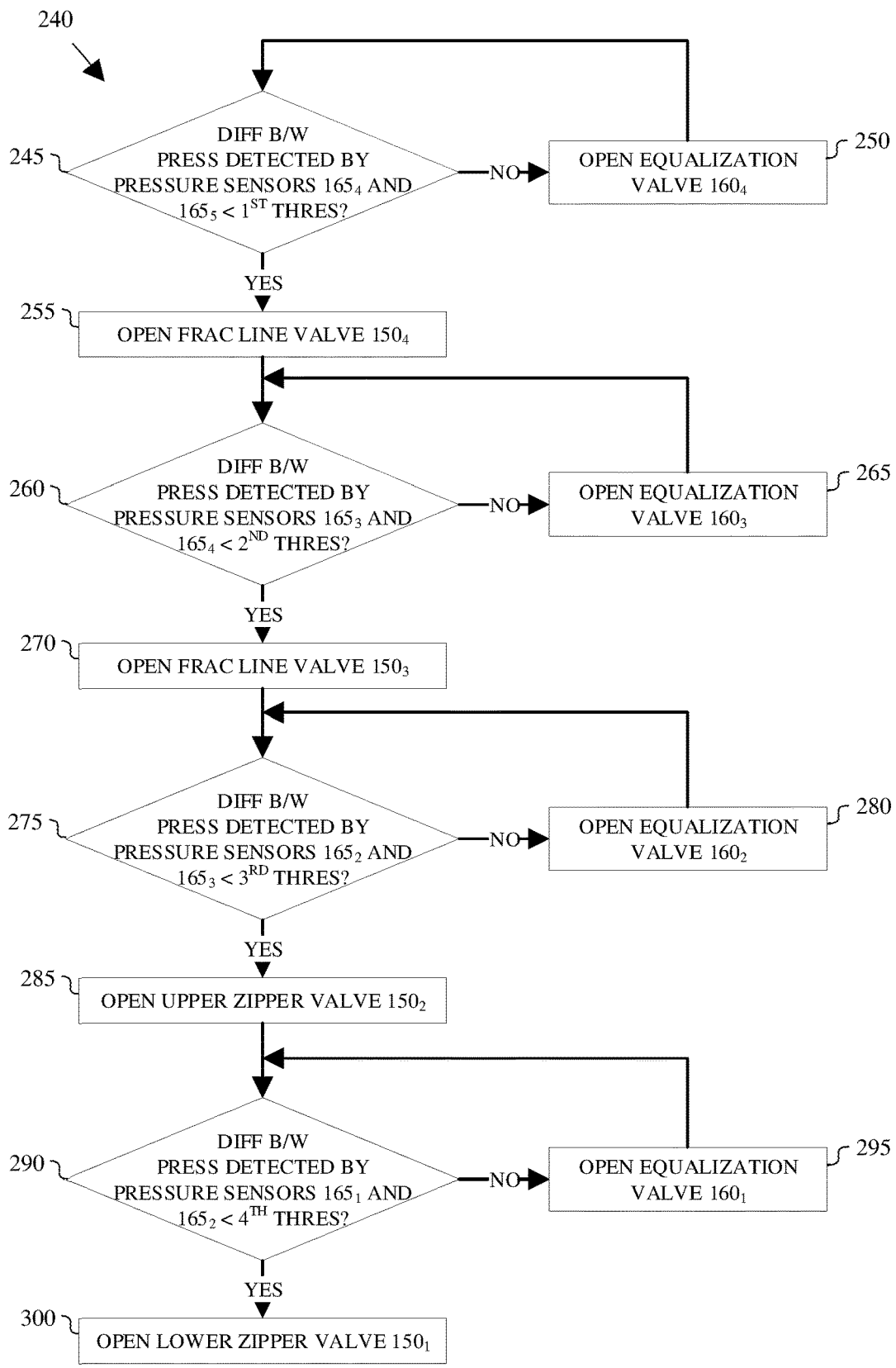
FIG. 6 is a flow diagram of a method for implementing one or more embodiments of the present disclosure.

Referring to FIG. 6, a method of equalizing the wellbore pressure exerted on the frac line valve $150_4$ with the pressure of the pumped hydraulic fracturing fluid is generally referred to by the reference numeral 240 and includes: at a step 245, determining, using the controller 180, if a difference between the pressures detected by pressure sensors $165_4$ and $165_5$ is below a first predetermined threshold; if said difference is above the first predetermined threshold, at a step 250, opening the equalization valve $160_4$ until said difference is below the first predetermined threshold; if said difference is below the first predetermined threshold, at a step 255, opening the frac line valve $150_4$; at a step 260, determining, using the controller 180, if a difference between the pressures detected by pressure sensors $165_3$ and $165_4$ is below a second predetermined threshold; if said difference is above the second predetermined threshold, at a step 265, opening the equalization valve $160_3$ until said difference is below the second predetermined threshold; if said difference is below the second predetermined threshold, at a step 270, opening the frac line valve $150_3$; at a step 275, determining, using the controller 180, if a difference between the pressures detected by pressure sensors $165_2$ and $165_3$ is below a third predetermined threshold; if said difference is above the third predetermined threshold, at a step 280, opening the equalization valve $160_2$ until said difference is below the third predetermined threshold; if said difference is below the third predetermined threshold, at a step 285, opening the upper zipper valve $150_2$; at a step 290, determining, using the controller 180, if a difference between the pressures detected by pressure sensors $165_1$ and $165_2$ is below a fourth predetermined threshold; if said difference is above the fourth predetermined threshold, at a step 295, opening the equalization valve $160_1$ until said difference is below the fourth predetermined threshold; and, if said difference is below the fourth predetermined threshold, at a step 300, opening the lower zipper valve $150_1$.

In one or more embodiments of the method 240, at least one of the first, second, third, and fourth predetermined thresholds is substantially identical to at least one other of the first, second, third, and fourth thresholds. In other embodiments of the method 240, at least one of the first, second, third, and fourth predetermined thresholds is different from at least one other of the first, second, third, and fourth predetermined thresholds. In one or more embodiments, the first, second, third, and/or fourth thresholds is/are user defined.

In one or more embodiments, the step(s) 245, 260, 275, and/or 290 may be referred to as "intelligent lockout" steps that disallow a requested actuation of the corresponding valve(s) $160_{1-4}$ due to excessive differential pressure(s) thereacross, as measured by corresponding pair(s) of the pressure sensors $165_{1-5}$. In addition to, or instead of, performing the "intelligent lockout" steps of the method 240, the system 100 may include one or more mechanical interlocks designed to utilize fluid pressure from the inlet and outlet sides of a particular to-be-actuated valve $160_{1,\,2,\,3,\,or\,4}$ to block hydraulic flow (i.e., preventing said $160_{1,\,2,\,3,\,or\,4}$ valve from opening) unless the pressure differential between said inlet and outlet sides is balanced.

In one or more embodiments, the step(s) 245, 260, 275, and/or 290 may be implemented via software stored on the controller 180 (or elsewhere) so that, when an operator desires to open one or more of the valves $160_{1-4}$, the software only allows such opening of the valve(s) $160_{1-4}$ if the differential pressure(s) across the valve(s) $160_{1-4}$ are less than the corresponding predetermined threshold(s) (i.e., the first, second, third, and/or fourth thresholds). In addition, or instead, such software may include combinational logic requiring various other condition(s) to be met prior to actuation of a particular to-be-actuated valve $160_{1,\,2,\,3,\,or\,4}$, such as, for example: the pressure in the wellbore $125_{1-N}$ with which the to-be-actuated valve $160_{1,\,2,\,3,\,or\,4}$ is associated must be below a predetermined threshold, above a predetermined threshold, or within a predetermined range; the pressure in one or more of the other wellbores $125_{1-N}$ in the system 100 must be below a predetermined threshold, above a predetermined threshold, or within a predetermined range; the state of the to-be-actuated valve $160_{1,\,2,\,3,\,or\,4}$ must be open, closed, or transitioning; the state(s) of the one or more other valves $160_{1,\,2,\,3,\,or\,4}$ in the system 100 must be open, closed, or transitioning (e.g., the other valve(s) $160_{1,\,2,\,3,\,or\,4}$ must be opened/closed/transitioning prior to actuation of the to-be-actuated valve $160_{1,\,2,\,3,\,or\,4}$); one or more other conditions must be met; or any combination thereof.

In one or more embodiments, certain steps of the method 240 are performed in the following sequential order: step 245, step 255, step 260, step 270, step 275, step 285, step 290, and step 300.

In one or more embodiments, certain steps of the method 240 are performed in the following sequential order: step 245, step 255, step 260, step 270, step 290, step 300, step 275, and step 285.

In one or more embodiments, certain steps of the method 240 are performed in the following sequential order: step 245, step 255, step 275, step 285, step 260, step 270, step 290, and step 300.

In one or more embodiments, certain steps of the method 240 are performed in the following sequential order: step 245, step 255, step 275, step 285, step 290, step 300, step 260, and step 270.

In one or more embodiments, certain steps of the method 240 are performed in the following sequential order: step 245, step 255, step 290, step 300, step 260, step 270, step 275, and step 285.

In one or more embodiments, certain steps of the method 240 are performed in the following sequential order: step 245, step 255, step 290, step 300, step 275, step 285, step 260, and step 270.

In one or more embodiments, certain steps of the method 240 are performed in the following sequential order: step 260, step 270, step 245, step 255, step 275, step 285, step 290, and step 300.

In one or more embodiments, certain steps of the method 240 are performed in the following sequential order: step 260, step 270, step 245, step 255, step 290, step 300, step 275, and step 285.

In one or more embodiments, certain steps of the method 240 are performed in the following sequential order: step 260, step 270, step 275, step 285, step 245, step 255, step 290, and step 300.

In one or more embodiments, certain steps of the method 240 are performed in the following sequential order: step 260, step 270, step 275, step 285, step 290, step 300, step 245, and step 255.

In one or more embodiments, certain steps of the method 240 are performed in the following sequential order: step 260, step 270, step 290, step 300, step 245, step 255, step 275, and step 285.

In one or more embodiments, certain steps of the method 240 are performed in the following sequential order: step 260, step 270, step 290, step 300, step 275, step 285, step 245, and step 255.

In one or more embodiments, certain steps of the method 240 are performed in the following sequential order: step 275, step 285, step 245, step 255, step 260, step 270, step 290, and step 300.

In one or more embodiments, certain steps of the method 240 are performed in the following sequential order: step 275, step 285, step 245, step 255, step 290, step 300, step 260, and step 270.

In one or more embodiments, certain steps of the method 240 are performed in the following sequential order: step 275, step 285, step 260, step 270, step 245, step 255, step 290, and step 300.

In one or more embodiments, certain steps of the method 240 are performed in the following sequential order: step 275, step 285, step 260, step 270, step 290, step 300, step 245, and step 255.

In one or more embodiments, certain steps of the method 240 are performed in the following sequential order: step 275, step 285, step 290, step 300, step 245, step 255, step 260, and step 270.

In one or more embodiments, certain steps of the method 240 are performed in the following sequential order: step 275, step 285, step 290, step 300, step 260, step 270, step 245, and step 255.

In one or more embodiments, certain steps of the method 240 are performed in the following sequential order: step 290, step 300, step 245, step 255, step 260, step 270, step 275, and step 285.

In one or more embodiments, certain steps of the method 240 are performed in the following sequential order: step 290, step 300, step 245, step 255, step 275, step 285, step 260, and step 270.

In one or more embodiments, certain steps of the method 240 are performed in the following sequential order: step 290, step 300, step 260, step 270, step 245, step 255, step 275, and step 285.

In one or more embodiments, certain steps of the method 240 are performed in the following sequential order: step 290, step 300, step 260, step 270, step 275, step 285, step 245, and step 255.

In one or more embodiments, certain steps of the method 240 are performed in the following sequential order: step 290, step 300, step 275, step 285, step 245, step 255, step 260, and step 270.

In one or more embodiments, certain steps of the method 240 are performed in the following sequential order: step 290, step 300, step 275, step 285, step 260, step 270, step 245, and step 255.

In one or more embodiments, prior to said hydraulic fracturing operation: the lower zipper valve $150_1$, the upper zipper valve $150_2$, the frac line valve $150_3$, the frac line valve $150_4$, the swab valve $150_5$, the upper master valve $150_6$, and the lower master valve $150_N$ may be closed; and pressure from the wellbore $125_1$ may be exerted on the lower master valve $150_N$. In such instances, in addition to the steps 245, 250, 255, 260, 265, 270, 275, 280, 285, 290, 295, and 300, the method 240 may further include: an additional step (substantially similar to the steps 245, 260, 275, and 290) of determining, using the controller 180, if a difference between the pressures detected by pressure sensors $165_7$ and $165_N$ is below a fifth predetermined threshold; if said difference is above the fifth predetermined threshold, an additional step (substantially similar to the steps 250, 265, 280, and 295) of opening the equalization valve $160_N$ until said difference is below the fifth predetermined threshold; if said difference is below the first predetermined threshold, an additional step (substantially similar to the steps 255, 270, 285, and 300) of opening the lower master valve $150_N$; an additional step (substantially similar to the steps 245, 260, 275, and 290) of determining, using the controller 180, if a difference between the pressures detected by pressure sensors $165_6$ and $165_7$ is below a sixth predetermined threshold; if said difference is above the sixth predetermined threshold, an additional step (substantially similar to the steps 250, 265, 280, and 295) of opening the equalization valve $160_6$ until said difference is below the sixth predetermined threshold; if said difference is below the sixth predetermined threshold, an additional step (substantially similar to the steps 255, 270, 285, and 300) of opening the upper master valve $150_6$; an additional step (substantially similar to the steps 245, 260, 275, and 290) of determining, using the controller 180, if a difference between the pressures detected by pressure sensors $165_5$ and $165_6$ is below a seventh predetermined threshold; if said difference is above the seventh predetermined threshold, an additional step (substantially similar to the steps 250, 265, 280, and 295) of opening the equalization valve $160_5$ until said difference is below the seventh predetermined threshold; and if said difference is below the seventh predetermined threshold, an additional step (substantially similar to the steps 255, 270, 285, and 300) of opening the swab valve $150_5$. Similar to the sequential order in which the steps 245, 250, 255, 260, 265, 270, 275, 280, 285, 290, 295, and 300 may be performed, the above-described additional steps of the method 240 may be performed in any sequential order before, during, or after the steps 245, 250, 255, 260, 265, 270, 275, 280, 285, 290, 295, and/or 300 are performed.

In one or more embodiments of the method 240, at least one of the first, second, third, fourth, fifth, sixth, and seventh predetermined thresholds is substantially identical to at least one other of the first, second, third, fourth, fifth, sixth, and seventh thresholds. In other embodiments of the method 240, at least one of the first, second, third, fourth, fifth, sixth, and seventh predetermined thresholds is different from at least one other of the first, second, third, fourth, fifth, sixth, and seventh predetermined thresholds. In one or more embodiments, the first, second, third, fourth, fifth, sixth, and/or seventh thresholds is/are user defined.

In various embodiments of the method 240, prior to said hydraulic fracturing operation, each of the lower zipper valve $150_1$, the upper zipper valve $150_2$, the frac line valve $150_3$, the frac line valve $150_4$, the swab valve $150_5$, the upper master valve $150_6$, and/or the lower master valve $150_N$ may be open, closed, or transitioning; accordingly, one or more of the steps 245, 250, 255, 260, 265, 270, 275, 280, 285, 290, 295, 300, and/or one or more of the other above-described steps of the method 240 may be omitted as needed so that execution of the method 240 equalizes the wellbore pressure(s) with the pressure of the pumped hydraulic fracturing fluid.

In one or more embodiments, the zipper modules $135_{2-N}$, the frac lines $140_{2-N}$, and the wellheads $120_{2-N}$ are substantially similar to, and operate in substantially the same manner as, the zipper module $135_1$, the frac line $140_1$, and the wellhead $120_1$; therefore, the structure and operation of the zipper modules $135_{2-N}$, the frac lines $140_{2-N}$, and the wellheads $120_{2-N}$ will not be described in more detail. Moreover, the various components of each of the zipper modules $135_{2-N}$, the frac lines $140_{2-N}$, and the wellheads $120_{2-N}$ may be identified hereinbelow using the same reference numerals as those associated with corresponding components of the zipper module $135_1$, the frac line $140_1$, and the wellhead $120_1$ (as set forth above and shown in FIGS. 2-4).

In one or more embodiments, the controller 180 is operably coupled to, and adapted to control, various components of the zipper modules $135_{2-N}$, the frac lines $140_{2-N}$, and the wellheads $120_{2-N}$ (i.e., the frac legs $146_{2-N}$) in a substantially similar manner as the manner in which the controller 180 is operably coupled to the lower zipper valve $150_1$, the equalization valve $160_1$, the upper zipper valve $150_2$, the equalization valve $160_2$, the frac line valve $150_3$, the equalization valve $160_3$, the frac line valve $150_4$, the equalization valve $160_4$, the swab valve $150_5$, the equalization valve $160_5$, the upper master valve $150_6$, the equalization valve $160_6$, the lower master valve $150_N$, and the equalization valve $160_N$. As a result, in addition to monitoring and controlling the zipper module $135_1$, the frac line $140_1$, and the wellhead $120_1$ (i.e., the frac leg $146_1$), the user interface 185 enables a user to monitor and control the zipper modules $135_{2-N}$, the frac lines $140_{2-N}$, and the wellheads $120_{2-N}$ (i.e., the frac legs $146_{2-N}$). Alternatively, one or more other controllers substantially similar to the controller 180 may be operably coupled to, and adapted to control, the various components of the zipper modules $135_{2-N}$, the frac lines $140_{2-N}$, and the wellheads $120_{2-N}$. In such instances, the user interface 185 or one or more other user interfaces substantially similar to the user interface 185 may be operably coupled to the one or more other controllers to enable a user to monitor and control the zipper modules $135_{2-N}$, the frac lines $140_{2-N}$, and the wellheads $120_{2-N}$.

In one or more embodiments, the operation of the system 100 and/or the execution of the method 240 allows an operator to remotely control one or more of the valves $150_{1-2}$ of the zipper modules $135_{1-N}$, one or more of the valves $150_{3-4}$ of the frac lines $140_{1-N}$, and/or one or more of the valves $150_{5-7}$ of the wellheads $120_{1-N}$ to conduct various wellbore operations on each of the wellbores $125_{1-N}$. As a result, the operation of the system 100 and/or the execution of the method 240 eliminates the need for personnel to enter the "red zone" (i.e., a predetermined area in the vicinity of the valve(s) $150_{1-N}$ deemed to be hazardous, unsafe, or less safe) in order to actuate the valve(s) $150_{1-N}$. As described above, during such remote control of the valve(s) $150_{1-N}$, the corresponding position sensor(s) $205_{1-N}$ send signal(s) to the controller 180 so that the controller can verify that the valve(s) $150_{1-N}$ are in the correct state to perform the desired wellbore operation (e.g., to hydraulically fracture one or more of the wellbores $125_{1-N}$, to perform wireline operations, to grease the valve(s) $150_{1-N}$, to perform "flow back" on one or more of the wellbores $125_{1-N}$, to perform coiled tubing operations, to perform another operation, or any combination thereof). In one or more embodiments, the operation of the system 100 and/or the execution of the method 240 provides feedback to an operator so that the operator can identify leaks in the zipper manifold 145, the zipper modules $135_{1-N}$, the frac lines $140_{1-N}$, the wellheads $120_{1-N}$, or elsewhere in the system 100 by monitoring the pressure sensor(s) $165_{1-N}$ and/or the position sensor(s) $205_{1-N}$ and/or $225_{1-N}$.

Figure 7A:
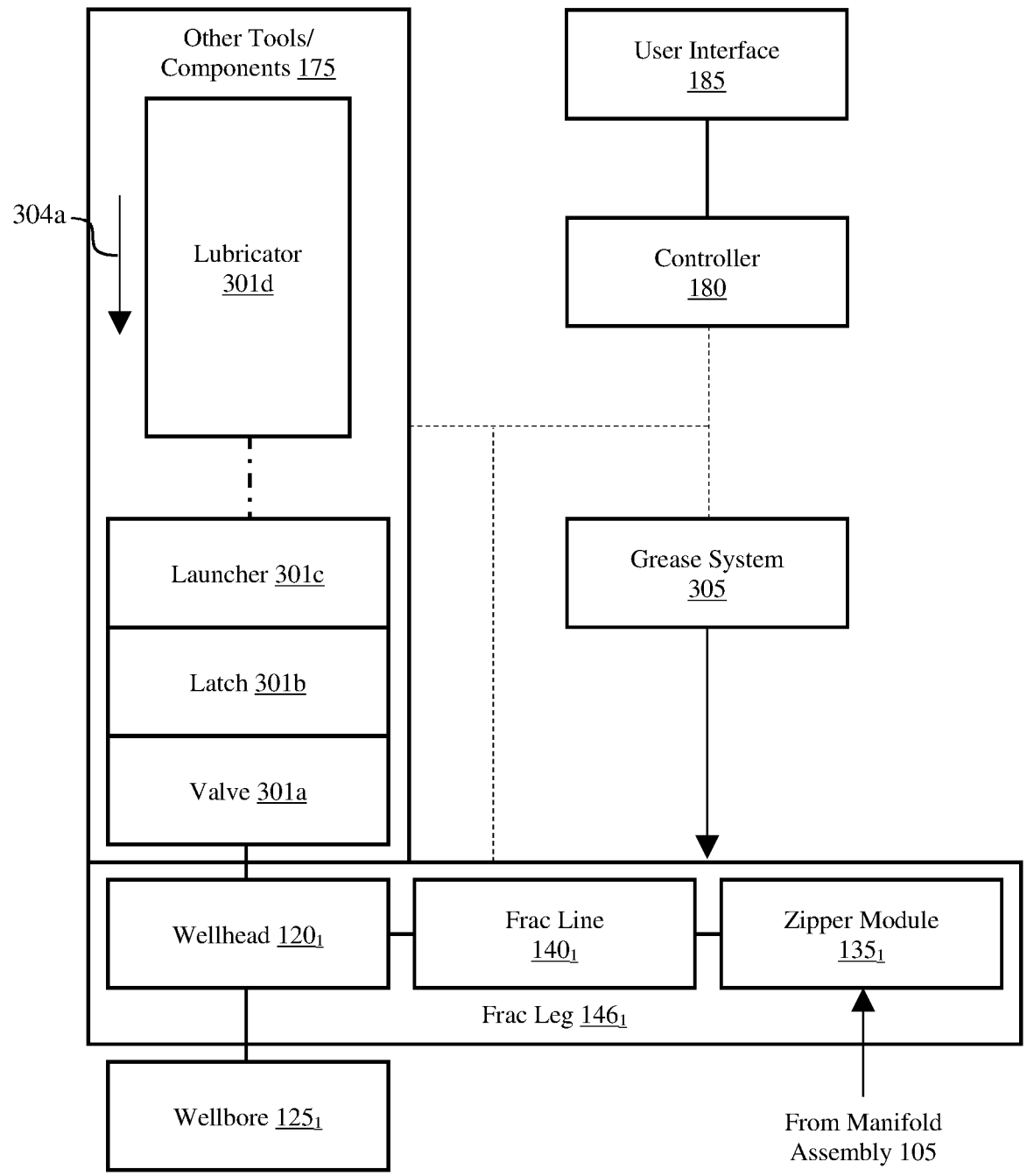
FIG. 7A is a diagrammatic illustration of one or more other wellhead tools or components of the wellhead of FIG. 2, said one or more other wellhead tools being in a first operational state or configuration during the execution of FIG. 8's method, according to one or more embodiments.
Figure 7B:
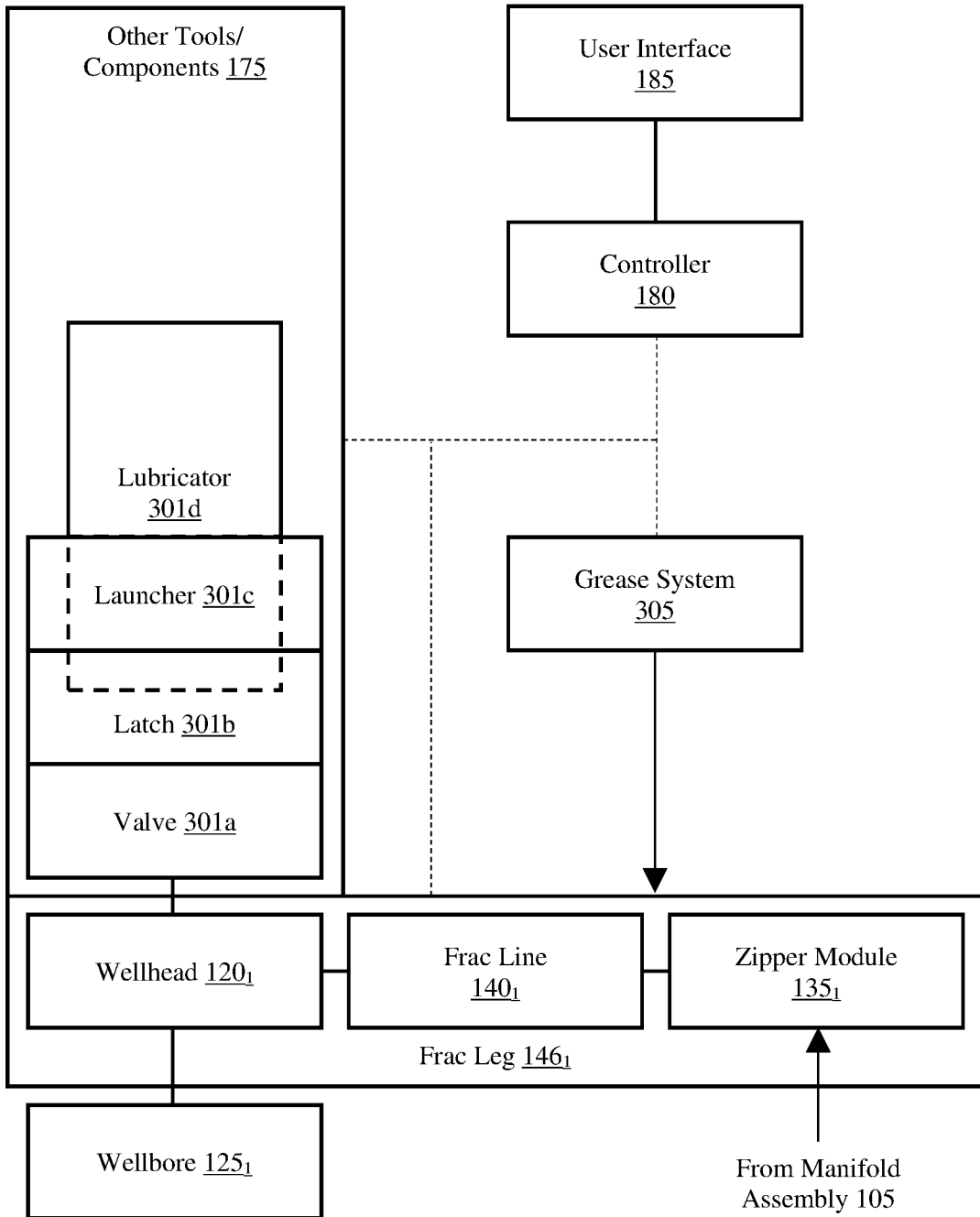
FIG. 7B is a diagrammatic illustration of the one or more other wellhead tools or components of the wellhead of FIG. 2, said one or more other wellhead tools being in a second operational state or configuration during the execution of FIG. 8's method, according to one or more embodiments.
Figure 7C:
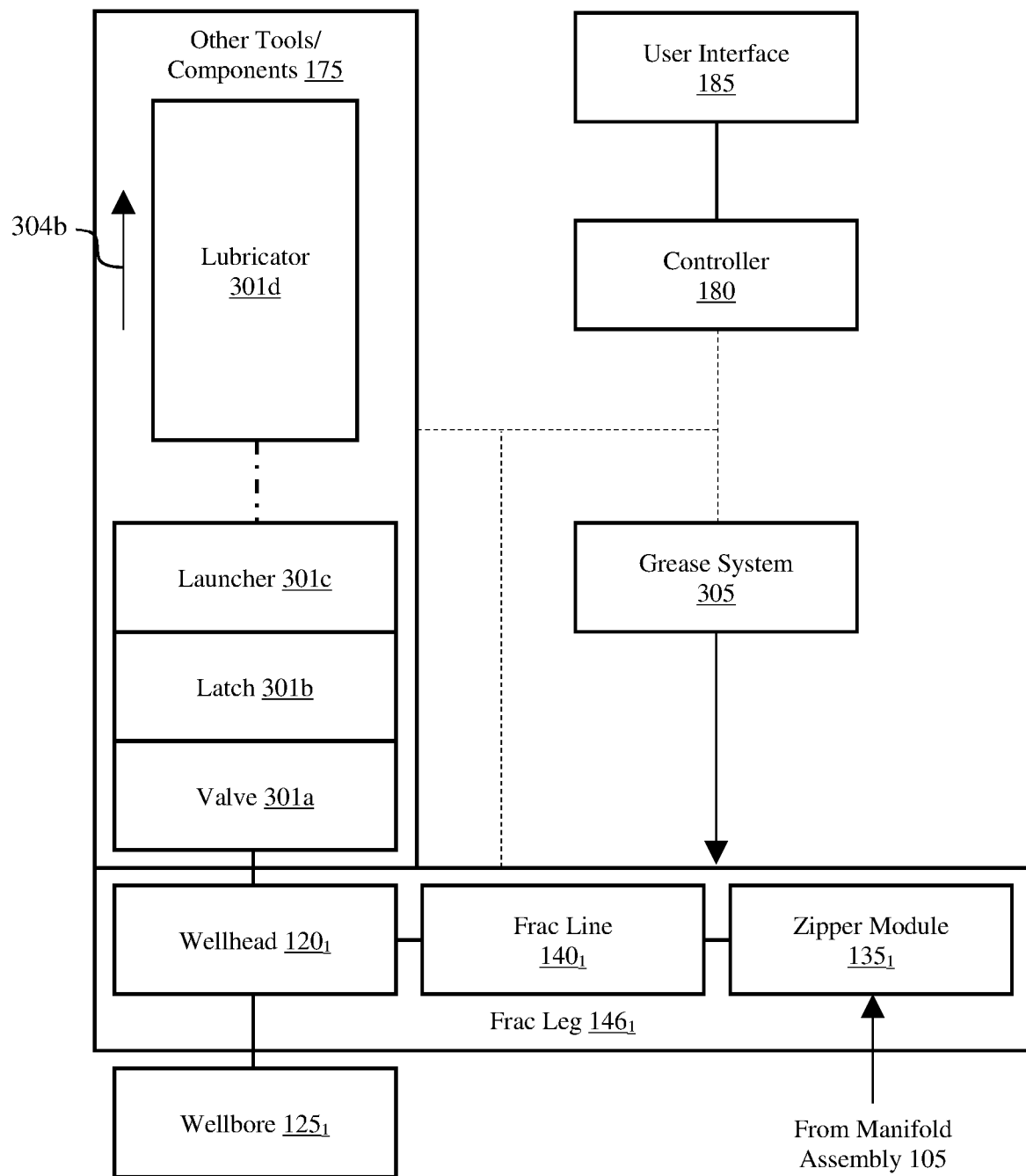
FIG. 7C is a diagrammatic illustration of the one or more other wellhead tools or components of the wellhead of FIG. 2, said one or more other wellhead tools being in a third operational state or configuration during the execution of FIG. 8's method, according to one or more embodiments.
Figure 7D:
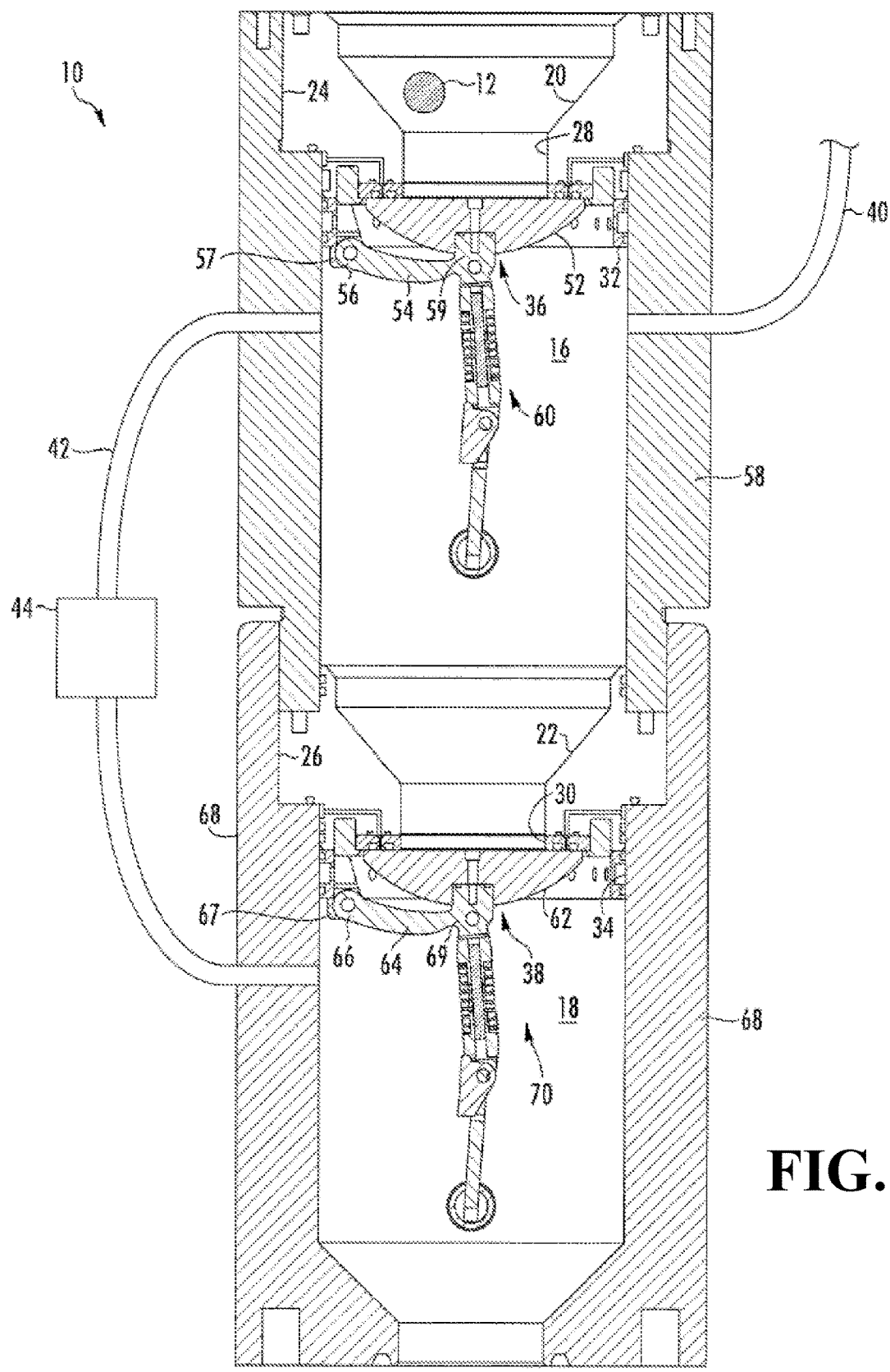
FIG. 7D is a cross-sectional view of a valve apparatus of the one or more other wellbore tools or components of FIGS. 7A through 7C, according to one or more embodiments.

Referring to FIGS. 7A-7C, in one or more embodiments, the one or more other wellhead tools or components 175 introduced in connection with FIG. 2 include a valve $301a$, a latch $301b$, a launcher $301c$, and a lubricator $301d$. For example, the one or more other wellhead tools or components 175 may be, include, or be part of the system described in the '156 application. The valve $301a$ is operably coupled to the wellhead $120_1$, which wellhead $120_1$ is the surface termination of the wellbore $125_1$. In one or more embodiments, the valve $301a$ is, includes, or is part of the valve apparatus described in the '785 application, the '203 application, or both; more particularly, in such embodiment(s), said valve apparatus 10 from the '785 and '203 applications, which is shown in FIG. 7D, may include a second containment area 16 (or "operating volume") disposed adjacent to a first containment area 14, and a third containment area 18 disposed adjacent to the second containment area 16 (on an opposite side of the second containment area 16 from the first containment area 14). Further, in such embodiment(s), a first valve 36 separates the first containment area 14 from the second containment area 16; adjusting the pressure of the fluid in the second containment area 16 allows the first valve 36 to open up and permit the object 12 placed into the first containment area 14 to pass into the second containment area 16. Further still, in such embodiment(s), a second valve 38 separates the second containment area 16 from the third containment area 18; once the pressure of the fluid in the second containment area 16 is within a certain range of the pressure of the fluid in the third containment area 18, the second valve 38 will open and permit an object 12 to pass from the second containment area 16 into the third containment area 18. Finally, in such embodiment(s), to manage the pressure of the fluid in the second containment area 16, the valve apparatus 10 can further include a second conduit 42 that fluidically connects the second containment area 16 to the third containment area 18; permitting fluid to flow through the second conduit 42 from the third containment area 18 into the second containment area 16 results in the pressure of the fluid in the second containment area 16 being increased to substantially the same pressure as the pressure of the fluid in the third containment area 18. The valve $301a$ is controlled by the controller 180. As discussed above, the user interface 185 communicates signals to, and receives signals from, the controller 180. The latch $301b$ is operably coupled to the valve $301a$, opposite the wellhead $120_1$. The launcher $301c$ is operably coupled to the latch $301b$, opposite the valve $301a$. In one or more embodiments, the launcher $301c$ is, includes, or is part of the launcher described in the '156 application. Although not shown in FIG. 1, in one or more embodiments, a blowout preventer (BOP) may be operably coupled to the launcher $301c$, opposite the latch $301b$.

The lubricator $301d$ is extendable through the launcher $301c$ (and the BOP attached thereto in certain embodiments) and, when so extended, attachable to the latch $301b$. More particularly, the controller 180 communicates signals to a hydraulic manifold, which signals cause the hydraulic manifold to communicate hydraulic fluid to, and/or receive hydraulic fluid from, the latch $301b$ to thereby operate the latch $301b$. Subsequently, the lubricator $301d$ is detachable from the latch $301b$ in a similar manner and, when so detached, retractable from the launcher $301c$. In one or more embodiments, the latch $301b$, the lubricator $301d$, and the process of attaching/detaching the lubricator $301d$ to/from the latch $301b$ are described in the '623 application, the '741 application, or a combination thereof.

Figure 8:
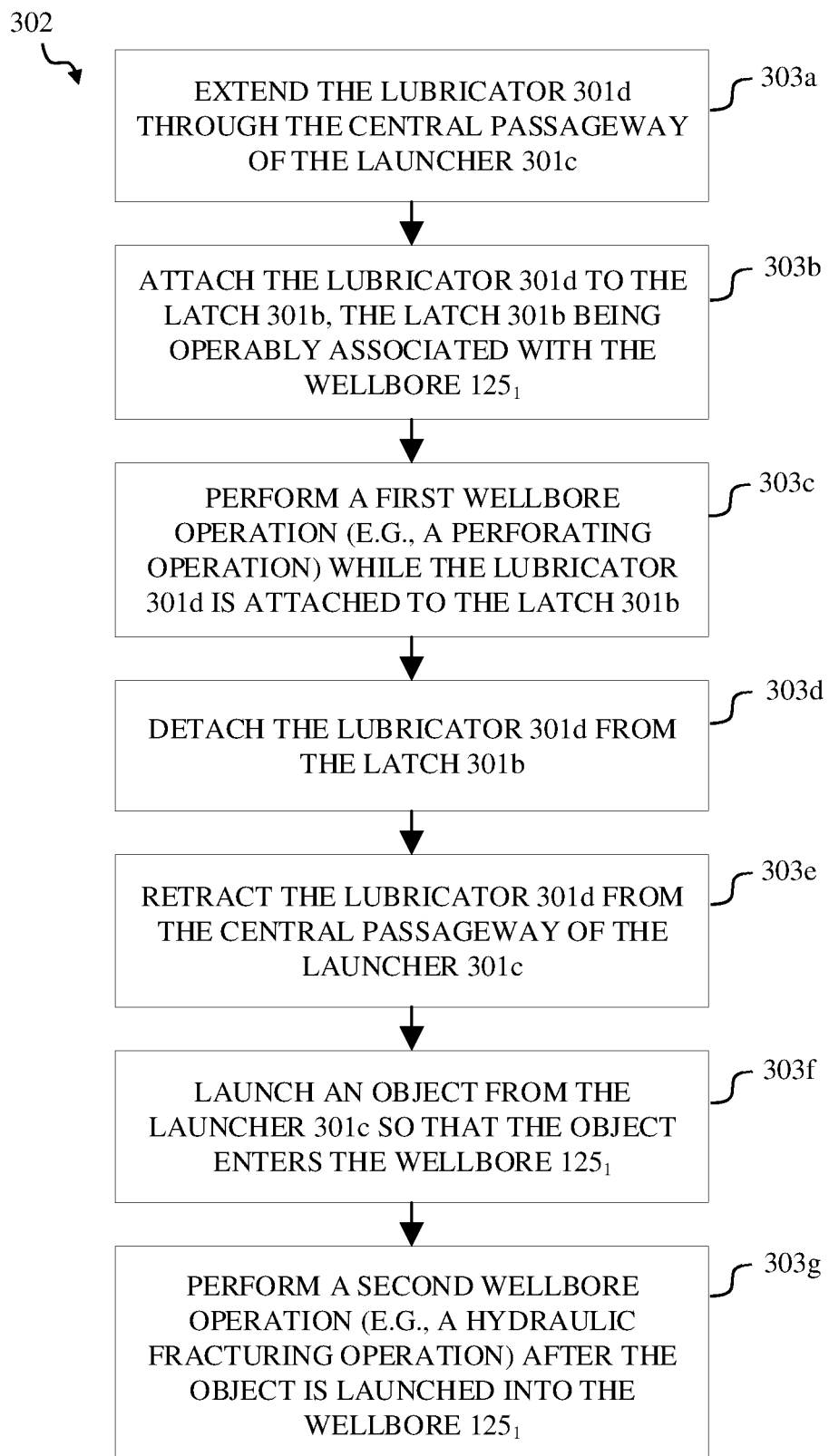
FIG. 8 is a flow diagram of a method for implementing one or more embodiments of the present disclosure.

Referring to FIG. 8, with continuing reference to FIGS. 7A-7C, in one or more embodiments, a method is generally referred to by the reference numeral 302. In one or more embodiments, the method 302 is executed using the one or more other wellhead tools or components 175. In at least one such instance, the launcher $301c$ is connected to the latch $301b$. Although not shown in FIGS. 7A-7C, in one or more embodiments, a blowout preventer (BOP) may be operably coupled to the launcher 301c, opposite the latch 301b. The method 302 includes, at a step 303a, extending the lubricator 301d through a central passageway of the launcher 301c. More particularly, the lubricator 301d is displaced in a direction 304a (as shown in FIG. 7A), through the central passageway of the launcher 301c (and the BOP attached thereto in certain embodiments), and into a central passageway of the latch 301b (as shown in FIG. 7B). At a step 303b, the lubricator 301d is attached to the latch 301b. In one or more embodiments, the step 303b is executed after the step 303a, and while the lubricator 301d extends through the central passageway of the launcher 301c. More particularly, the step 303b is executable when the lubricator 301d extends through the central passageway of the launcher and into the central passageway of the latch 301b (as shown in FIG. 7B). In one or more embodiments, the latch 301b, the lubricator 301d, and the process of attaching the lubricator 301d to the latch 301b are described in the '623 application, the '741 application, or a combination thereof.

At a step 303c, a first wellbore operation (e.g., a perforating operation such as, for example, a ball and sleeve operation) is performed while the lubricator 301d is attached to the latch 301b. In one or more embodiments, the step 303c is executable by deploying a downhole tool (not shown; e.g., a plug and perforating guns) from the lubricator 301d on a conveyance string (e.g., wireline) while the lubricator 301d is attached to the latch 301b. More particularly, the downhole tool passes through the central passageway of the latch 301b, through a central passageway of the valve 301a, through a central passageway of the wellhead $120_1$, and into the wellbore $125_1$. In one or more embodiments, the valve 301a and the process of passing the downhole tool through the valve 301a and into the wellbore $125_1$ are described in the '785 application, the '203 application, or both.

For example, the controller 180 may receive a signal from a sensor indicating that the valve 301a is open, thereby determining that wireline is in the wellbore $125_1$. After the controller 180 receives such a signal, the controller 180 may then "lock-out" actuation of one or more of the valves $150_{1-N}$ (e.g., the valves $150_{5-N}$ of the wellhead $120_1$) until the controller 180 receives another signal (or ceases to receive the original signal) from the sensor indicating that the valve 301a is closed, thereby determining that the wireline is out of the wellbore $125_1$. Such a process helps to prevent users from inadvertently cutting the wireline via actuation of one or more of the valves $150_{1-N}$, which is a common failure. A manual override of this process may be utilized just in case a user needs to intentionally cut the wireline for emergency purposes.

In those embodiments in which the downhole tool includes the plug and perforating guns, the plug is set, the perforating guns are fired, and the spent perforating guns are retrieved from the wellbore $125_1$ and back into the lubricator 301d to complete execution of the step 303c. At a step 303d, the lubricator 301d is detached from the latch 301b. In one or more embodiments, the step 303d is executed after the first wellbore operation is performed at the step 303c (e.g., after the spent perforating guns are retrieved from the wellbore $125_1$ and back into the lubricator 301d). In one or more embodiments, the latch 301b, the lubricator 301d, and the process of detaching the lubricator 301d from the latch 301b are described in the '623 application, the '741 application, or a combination thereof.

At a step 303e, the lubricator 301d is retracted from the central passageway of the launcher 301c. In one or more embodiments, the step 303e is executed after the step 303d. More particularly, the lubricator 301d is displaced in a direction 304b (as shown in FIG. 7C) to execute the step 303e. At a step 303f, an object is launched from the launcher 301c so that the object enters the wellbore $125_1$. In one or more embodiments, the step 303f is executed after the step 303e. The execution of the step 303f causes the object to pass through the valve 301a before entering the wellbore $125_1$. In one or more embodiments, the valve 301a and the process of passing the object therethrough is described in the '785 application, the '203 application, or both. Finally, at a step 303g, a second wellbore operation (e.g., a hydraulic fracturing operation) is performed. In one or more embodiments, the step 303g is executed after the step 303f. In those embodiments in which the second wellbore operation is a hydraulic fracturing operation, a hydraulic fracturing fluid is pumped into the wellbore $125_1$ via the frac leg $146_1$ to facilitate execution of the step 303g.

Figure 9:
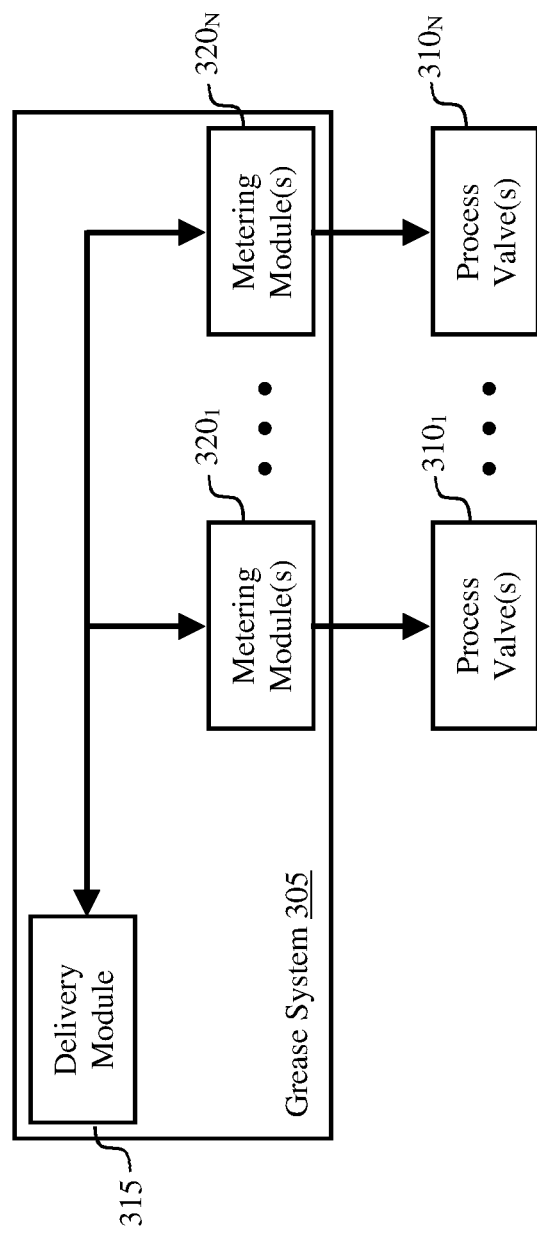
FIG. 9 is a diagrammatic illustration of a system for lubricating process valves, the system including a delivery module and metering modules, according to one or more embodiments of the present disclosure.

Referring to FIG. 9, with continuing reference to FIGS. 1 and 2, in one or more embodiments, the grease system 305 is used to deliver and meter grease to process valves $310_{1-N}$ used in oil and gas operations. For example, the process valves $310_{1-N}$ to which the grease system 305 delivers and meters grease may be, include, or be part of the lower zipper valve $150_1$, the equalization valve $160_1$, the upper zipper valve $150_2$, the equalization valve $160_2$, the frac line valve $150_3$, the equalization valve $160_3$, the frac line valve $150_4$, the equalization valve $160_4$, the swab valve $150_5$, the equalization valve $160_5$, the upper master valve $150_6$, the equalization valve $160_6$, the lower master valve $150_N$, the equalization valve $160_N$, or any combination thereof. As discussed above, the grease system 305 includes the delivery module 315 and the metering modules $320_{1-N}$. The metering modules $320_{1-N}$ are each operably associated with, and adapted to be in communication with, the delivery module 315. Likewise, the process valves $310_{1-N}$ are operably associated with, and adapted to be in communication with, the metering modules $320_{1-N}$, respectively. In operation, to grease the process valves $310_{1-N}$, the metering modules $320_{1-N}$ are adapted to force grease from the delivery module 315 into the respective process valves $310_{1-N}$.

Figure 10:
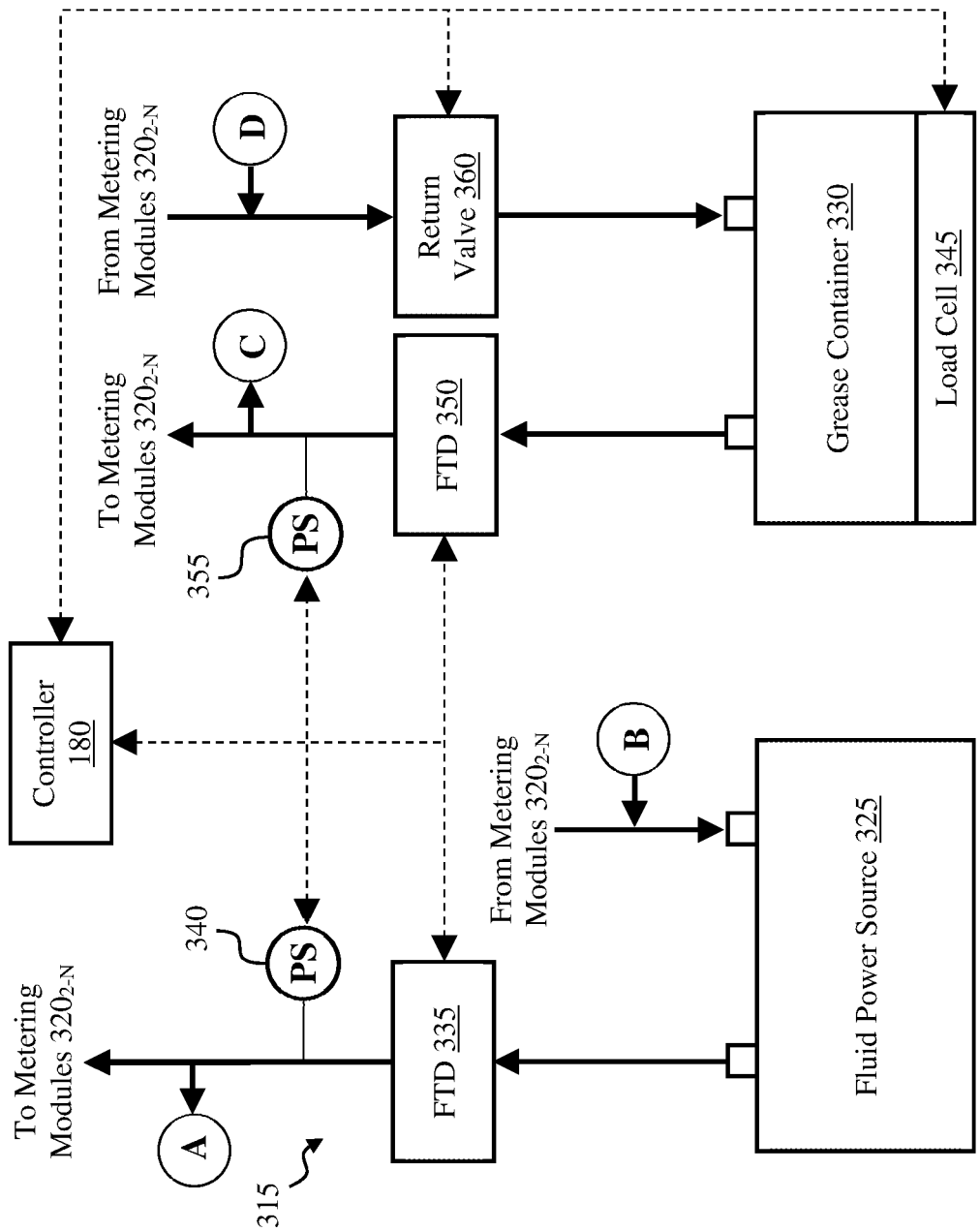
FIG. 10 is a diagrammatic illustration of the delivery module of FIG. 9, according to one or more embodiments of the present disclosure.

Referring to FIG. 10 with continuing reference to FIG. 9, in one or more embodiments, the delivery module 315 includes a fluid power source 325 and a grease container 330. The fluid power source 325 stores a power fluid for forcing grease from the grease container 330 into the process valves $310_{1-N}$, as will be described in more detail below. A fluid transport device 335 is operably associated with the fluid power source 325. The fluid transport device 335 can be a pump or a compressor, depending on the nature of the power fluid being used. In addition, or instead, the fluid transport device 335 may be or include a hydraulic power unit ("HPU") accumulator. In any case, the fluid transport device 335 is adapted to transport the power fluid from the fluid power source 325 to the metering modules $320_{1-N}$. A pressure sensor 340 is operably associated with the fluid transport device 335. The pressure sensor 340 is adapted to detect the pressure of the power fluid discharged from the fluid transport device 335. In addition to providing the power fluid transported to the metering modules $320_{1-N}$, the fluid power source 325 is also adapted to receive recycled power fluid from the metering modules $320_{1-N}$.

The grease container 330 stores grease. A grease measuring device 345 such as, for example, a load cell (e.g., a scale) is operably associated with the grease container 330. The grease measuring device 345 may be adapted to measure a mass of the grease container 330 to keep track of the amount of grease that has been used and how much is remaining. However, although described herein as a load cell, the grease measuring device 345 may be any suitable device capable of monitoring the amount of grease in the grease container 330 such as, for example, a ranging device, a linear position transducer, an optical/laser device, or the like that measures a level of the grease within the grease container 330. A fluid transport device 350 is operably associated with the grease container 330. The fluid transport device 350 can be a pump or a compressor, depending on the nature of the power fluid being used. In addition, or instead, the fluid transport device 350 may be or include a hydraulic power unit ("HPU") accumulator. In any case, the fluid transport device 350 is adapted to transport grease from the grease container 330 to the metering modules $320_{1-N}$. A pressure sensor 355 is operably associated with the fluid transport device 350. The pressure sensor 355 is adapted to detect the pressure of the grease discharged from the fluid transport device 350. In addition to providing the grease transported to the metering modules $320_{1-N}$, the grease container 330 is also adapted to receive recycled grease from the metering modules $320_{1-N}$. To this end, a return valve 360 is operably associated with the grease container 330 and adapted to selectively permit communication of the recycled grease from the metering modules $320_{1-N}$ to the grease container 330.

In one or more embodiments, as in FIG. 10, the grease system 305 also includes the controller 180. The controller 180 is adapted to send control signals to the fluid transport devices 335 and 350 and the return valve 360. In addition, the controller 180 may receive operating speed data from the fluid transport devices 335 and 350 and/or valve position data from the return valve 360. The controller 180 is also adapted to receive data/readings from the pressure sensors 340 and 355 (e.g., pressure data) and the grease measuring device 345 (e.g., grease measurement data).

Figure 11:
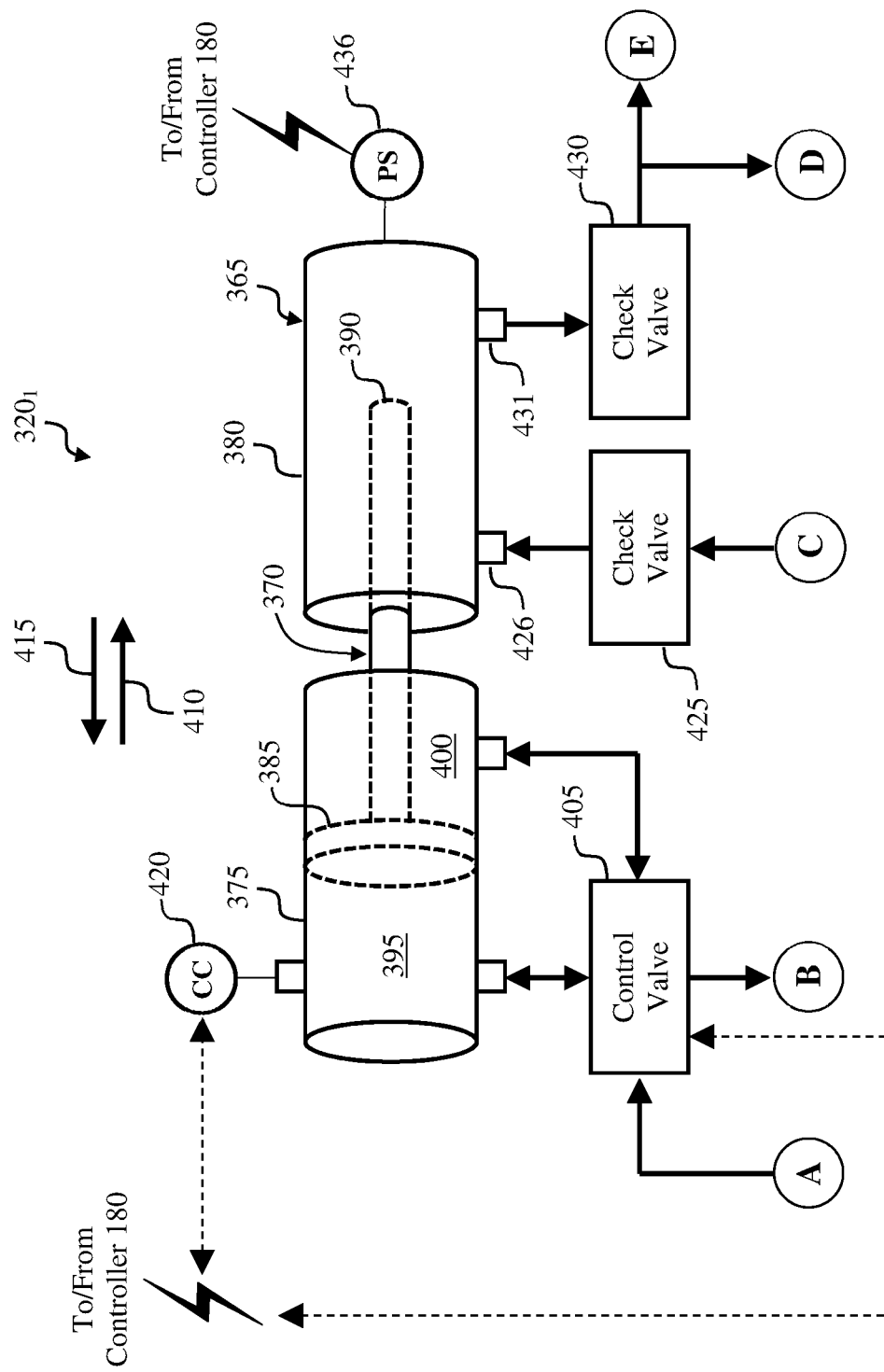
FIG. 11 is a diagrammatic illustration of a first embodiment of one of the metering modules of FIG. 9, according to one or more embodiments of the present disclosure.

In one or more embodiments, the metering modules $320_{1-N}$ are substantially identical to each other and, therefore, in connection with FIG. 11, only the metering module $320_1$ will be described in detail below; however, the description below also applies to the metering modules $320_{2-N}$. Referring to FIG. 11, with continuing reference to FIGS. 9 and 10, in one or more embodiments, to meter the amount of grease to a particular one of the process valves $310_1$, the metering module $320_1$ includes a grease metering device 365 such as, for example, a grease pump. In one or more embodiments, as in FIG. 11, the grease metering device 365 includes a piston 370, a power cylinder 375, and a grease cylinder 380.

The piston 370 includes a head portion 385 and a rod portion 390. The head portion 385 is slidably disposed in the power cylinder 375 and divides the power cylinder 375 into chambers 395 and 400. The rod portion 390 extends from the head portion 385 into the grease cylinder 380 so that, as the head portion 385 travels back and forth in the power cylinder 375, the rod portion 390 extends at least partially into, and retracts at least partially out of, the grease cylinder 380. The piston 370 may be displaced within the power cylinder 375 via hydraulic or pneumatic power; thus, in one or more embodiments, the power fluid stored by the fluid power source 325 is hydraulic or pneumatic. In addition, or instead, electric or gas power may be utilized to displace the piston 370.

In one or more embodiments, as in FIG. 11, a control valve 405 is operably associated with the power cylinder 375. The control valve 405 is adapted to receive the power fluid from the fluid transport device 335. To stroke the piston 370 in a direction 410, the control valve 405 is adapted to communicate power fluid from the fluid transport device 335 to the chamber 395 and, at the same time, to communicate power fluid from the chamber 400 back to the fluid power source 325. Similarly, to stroke the piston 370 in a direction 415, which is opposite the direction 410, the control valve 405 is adapted to communicate power fluid from the fluid transport device 335 to the chamber 400 and, at the same time, to communicate power fluid received from the chamber 395 back to the fluid power source 325. In addition, the pressure of the grease within the grease cylinder 380 forces the piston 370 in the direction 415. In one or more embodiments, the force exerted on the piston 370 by the grease within the grease cylinder 380 is sufficient by itself to stroke the piston 370 in the direction 415. Accordingly, to ensure that the grease cylinder 380 is filled with grease before being stroked in the direction 410, the force exerted on the piston 370 by the grease within the grease cylinder 380 may itself be relied on to stroke the piston 370 in the direction 415. In one or more embodiments, the fluid power source 325, the fluid transport device 335, the pressure sensor 340, the power cylinder 375, the control valve 405, or any combination thereof, may collectively be referred to herein as an "actuator" (i.e., hydraulic- or pneumatic-powered) for stroking the piston 370 back and forth within the grease cylinder 380. However, in addition, or instead, another "actuator" may also be used to stroke the piston 370 back and forth within the grease cylinder 380 such as, for example, an electric- or gas-powered actuator.

A cycle counter 420 is operably associated with the power cylinder 375. The cycle counter 420 may be or include limit switch(es) or other sensor(s) operably associated with the actuator to give analog or other linear position feedback. In any case, the cycle counter 420 is adapted to count the strokes of the piston 370 within the power cylinder 375. In one or more embodiments, the cycle counter 420 is capable of detecting partial strokes of the piston 370 to further enable precise greasing of the process valves $310_1$. As a result, if so desired, the grease system 305 is capable of partially greasing the process valves $310_1$ by allowing an operator to enter the "desired percentage" of grease required. In one or more embodiments, as in FIG. 11, the controller 180 is adapted to send control signals to the control valve 405. In addition, the controller 180 may receive valve position data from the control valve 405. The controller 180 is also adapted to receive data/readings (e.g., stroke count data) from the cycle counter 420.

A check valve 425 is operably associated with an inlet 426 of the grease cylinder 380 and is adapted to communicate grease from the fluid transport device 350 to the grease cylinder 380 while preventing, or at least reducing, any backflow of the grease through the check valve 425. As a result, when the piston 370 is stroked in the direction 415, the rod portion 390 is retracted at least partially out of the grease cylinder 380 and the check valve 425 permits grease to be drawn into the grease cylinder 380 via the inlet 426. At the same time, a check valve 430 prevents grease from being drawn into the grease cylinder 380 via an outlet 431. The check valve 430 is operably associated with the outlet 431 of the grease cylinder 380 and is adapted to communicate grease from the grease cylinder 380 to the process valves $310_1$ while preventing, or at least reducing, any backflow of the grease through the check valve 430. As a result, when the piston 370 is stroked in the direction 410, the rod portion 390 is extended at least partially into the grease cylinder 380 and the check valve 430 permits grease to be forced out of the grease cylinder 380 via the outlet 431. At the same time, the check valve 425 prevents grease from being forced out of the grease cylinder 380 via the inlet 426. In one or more embodiments, the check valve 430 is biased to the closed position with more force (e.g., tighter springs) than that of the check valve 425 in order to maintain the pressure of the grease within the grease cylinder 380. For example, springs in the check valve 430 can be tuned to a desired cracking pressure (e.g., about 1000 psi) to determine the pressure of the grease within the grease cylinder 380.

In one or more embodiments, the grease metering device 365 is "double-acting" and includes a second grease cylinder substantially identical to the grease cylinder 380 and a second rod portion substantially identical to the rod portion 390; the second rod portion extends from the head portion 385 into the second grease cylinder so that, as the head portion 385 travels back and forth in the power cylinder 375, the second rod portion extends at least partially into, and retracts at least partially out of, the second grease cylinder.

Figure 12:
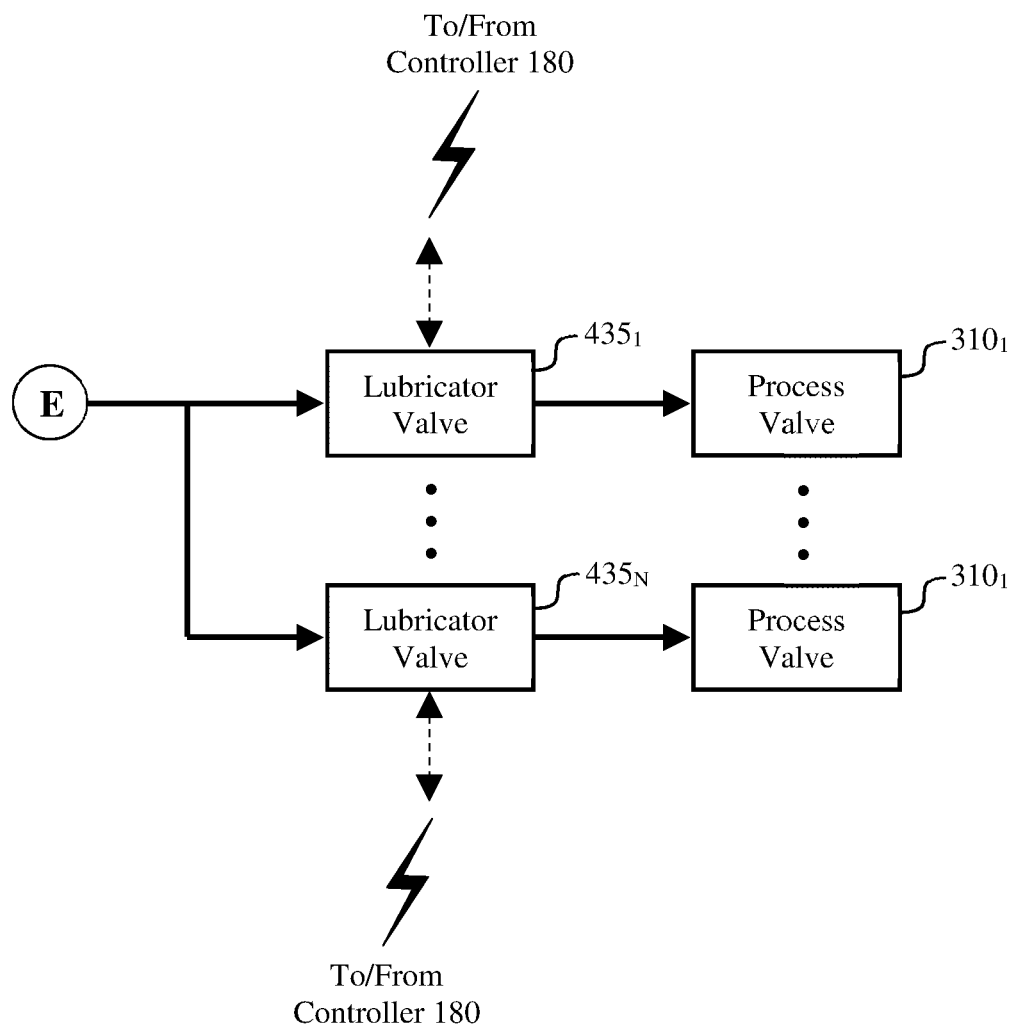
FIG. 12 is a diagrammatic illustration of lubricator valves operably associated with at least some of the process valves of FIG. 9, according to one or more embodiments of the present disclosure.

Referring to FIG. 12 with continuing reference to FIGS. 9-11, in one or more embodiments, the process valves $310_1$ are adapted to be in communication with the metering module $320_1$ via lubricator valves $435_{1-N}$, respectively. In one or more embodiments, the lubricator valves $435_{1-N}$ are part of the metering module $320_1$. Similarly, the process valves $310_{2-N}$ may be adapted to be in communication with the metering modules $320_{2-N}$, respectively, via lubricator valve(s) substantially identical to the lubricator valves $435_{1-N}$. The lubricator valves $435_{1-N}$ are adapted to selectively communicate grease from the grease cylinder 380 (shown in FIG. 11) to respective ones of the process valves $310_1$ (shown in FIG. 12). In one or more embodiments, as in FIG. 12, the controller 180 is adapted to send control signals to the lubricator valves $435_{1-N}$. In addition, the controller 180 may receive valve position data from the lubricator valves $435_{1-N}$.

Alternatively, in one or more embodiments, the grease metering device 365 may be omitted and replaced with flow meters that are operably associated with respective ones of the process valves $310_1$ (and thus respective ones of the lubricator valves $435_{1-N}$; in such embodiments, the controller 180 receives feedback from the flow meters and actuates the lubricator valves $435_{1-N}$ to meter a desired amount of grease to the process valves $310_1$ using the fluid transport device 350. In one or more embodiments, the grease system 305 further includes one or more pressure sensors located downstream from the check valve 430 (e.g., to monitor pressure within the process valves $310_1$); as a result, using data/readings obtained from these one or more pressure sensors, the controller 180 can ensure that the greasing pressure is greater than the pressure within the process valves $310_1$. Additional valves may also be added downstream from the check valve 430 to provide double barriers to prevent, or at least reduce, any leakage of process fluid from the process valve.

Referring collectively to FIGS. 9-12, in operation, the fluid transport device 335 transports power fluid from the fluid power source 325 to the control valve 405 of the metering module $320_1$. During the transporting of the power fluid to the control valve 405, the controller 180 communicates control signals to the fluid transport device 335 and receives data/readings from the pressure sensor 340. As a result, the controller 180 can adjust the flow of the power fluid to the control valve 405 using the fluid transport device 335 and monitor the pressure of the power fluid exiting the fluid transport device 335 using the pressure sensor 340. The control valve 405 actuates the piston 370 within the power cylinder 375. To actuate the piston 370 in the direction 410 within the power cylinder 375, the control valve 405 communicates power fluid from the 130 to the chamber 395 and, at the same time, communicates power fluid from the chamber 400 back to the fluid power source 325. Conversely, to actuate the piston 370 in the direction 415 within the power cylinder 375, the control valve 405 communicates power fluid from the fluid transport device 335 to the chamber 400 and, at the same time, communicates power fluid from the chamber 395 back to the fluid power source 325. During the actuation of the piston 370 within the power cylinder 375, the controller 180 communicates control signals to the control valve 405 and receives data/readings from the cycle counter 420. As a result, the controller 180 can stroke the piston 370 back and forth within the power cylinder 375 using the control valve 405 and count the strokes of the piston 370 back and forth within the power cylinder 375 using the cycle counter 420. In other embodiments, in addition, or instead, electric or gas power may be utilized to actuate the piston 370.

The fluid transport device 350 transports grease from the grease container 330 to the inlet 426 of the grease cylinder 380. During the transporting of the grease to the grease cylinder 380, the controller 180 communicates control signals to the fluid transport device 350 and receives data/readings from the pressure sensor 355. As a result, the controller 180 can adjust the flow of the grease to the grease cylinder 380 using the fluid transport device 350 and monitor the pressure of the grease exiting the fluid transport device 350 using the pressure sensor 355. As the piston 370 is actuated in the direction 415, the grease is drawn into the grease cylinder 380 through the inlet 426. The transporting of the grease to the grease cylinder 380 using the fluid transport device 350 allows the grease to be more efficiently and completely drawn into the grease cylinder 380 through the inlet 426 as the piston 370 is actuated in the direction 415. Conversely, as the piston 370 is actuated in the direction 410, the grease is forced out of the grease cylinder 380 through the outlet 431. The lubricator valves $435_{1-N}$ selectively communicate the grease forced out of the grease cylinder 380 to respective ones of the process valves $310_1$. In addition, the return valve 360 selectively communicates the grease forced out of the grease cylinder 380 back to the grease container 330.

The controller 180 communicates control signals to the return valve 360 and the lubricator valves $435_{1-N}$. As a result, the controller 180 can selectively actuate the return valve 360 and the lubricator valves $435_{1-N}$ to determine: whether the grease forced out of the grease cylinder 380 is communicated back to the grease container 330; and/or which of the process valves $310_1$ receives the grease forced out of the grease cylinder 380. For example, if the controller 180 closes the return valve 360, opens one of the lubricator valves $435_{1-N}$, and closes the remaining lubricator valves $435_{1-N}$, the grease forced out of the grease cylinder 380 will be communicated to the process valve $310_1$ that is operably associated with the opened one of the lubricator valves $435_{1-N}$. For another example, if the controller 180 opens the return valve 360 and closes the lubricator valves $435_{1-N}$, the grease forced out of the grease cylinder 380 will be communicated back to the grease container 330. Alternatively, the return valve 360 could bypass the grease cylinder 380 by communicating grease back to the grease container 330 before the grease passes through the check valve 425.

The volume of grease forced out of the grease cylinder 380 with each stroke of the piston 370 can be determined via measurement or calculation (e.g., by multiplying the cross-sectional area of the rod portion 390 by the length of the piston 370's stroke); as a result, by controlling and/or monitoring the control valve 405, the cycle counter 420, the lubricator valves $435_{1-N}$, the return valve 360, or any combination thereof, the controller 180 meters a desired amount of grease to each of the process valves $310_1$. In one or more embodiments, the desired amount of grease metered to each of the process valves $310_1$ can be specifically tailored according to greasing volume and/or frequency guidelines provided, for example, by the manufacturer(s) of the process valves $310_1$ and stored in a database accessible by the controller 180. In addition, or instead, the desired amount of grease metered to each of the process valves $310_1$ may be provided by a user via a user interface (HMI) connected to the controller 180; if so desired, the amount of grease metered to each of the process valves $310_1$ can be changed during a job. In addition, by controlling and/or monitoring the fluid transport devices 335 and 350 and the pressure sensors 340 and 355, the controller 180 regulates the flow of the power fluid and the grease within the grease system 305.

In one or more embodiments, the controller 180 is further adapted to receive data/readings from a pressure sensor 436 (shown in FIG. 11) that detects the pressure of the grease within the grease cylinder 380; by comparing the data/reading obtained from the pressure sensor 436 with data/readings obtained from the pressure sensor 355, the controller 180 can determine whether the grease cylinder 380 is filled with grease after the piston 370 is stroked in the direction 415. As a result, the controller 180 can delay stroking the piston in the direction 410 until the grease cylinder 380 is completely filled with grease, thus improving the accuracy of greasing operations. In one or more embodiments, the controller 180 controls the metering modules $320_{2-N}$ to deliver and meter grease to the process valves $310_{2-N}$ in substantially the same manner as that described above with respect to the metering module $320_1$ and the process valves $310_1$; therefore, the operation of the metering modules $320_{2-N}$ to deliver and meter grease to the process valves $310_{2-N}$ will not be described in further detail. As a result, the controller 180 is capable of greasing the process valves $310_{1-N}$ at any of the following intervals: timed intervals; continuous greasing (at a rate specified by the user or the database); greasing on command from an operator via a user interface (HMI) at any time; per operational stage (e.g., fracturing stage); per N stages; scheduled greasing; scheduled partial greasing; and/or any combination thereof.

In one or more embodiments, prior to delivering and metering grease to the process valves $310_{1-N}$, the grease system 305 is capable of verifying that the process valves $310_{1-N}$ are actuated to the proper position for greasing. To achieve such verification, the grease system 305 includes sensor(s) (e.g., the position sensors $205_1$ and $225_1$ shown in FIGS. 3 and 4) associated with the process valves $310_{1-N}$ to ensure they are in the proper position prior to greasing. Such sensor(s) may include, for example, position sensor(s) and/or visual feedback devices (e.g., camera(s), image processing software, etc.) capable of detecting the position of the process valves $310_{1-N}$. In addition, the grease system 305 may include actuator(s) adapted to receive control signals from the controller 180 to open or close the process valves $310_{1-N}$. As a result, the controller 180 is able to automatically place the process valves $310_{1-N}$ in the proper greasing position prior to greasing.

Referring to FIG. 13, in one or more embodiments, a method of operating the grease system 305 is generally referred to by the reference numeral 440. The method 440 is carried out by receiving, at the controller 180, data/readings from the delivery module 315 (e.g., the pressure sensors 340 and 355) and/or the metering modules $320_{1-N}$ (e.g., the cycle counter 420), and sending, from the controller 180, control signals to the delivery module 315 (e.g., the fluid transport devices 335 and 350, the return valve 360, or any combination thereof) and/or the metering modules $320_{1-N}$ (e.g., the control valve 405, the lubricator valves $435_{1-N}$, or any combination thereof).

The method 440 includes at a step 445 delivering grease to a first one of the metering modules $320_{1-N}$. In one or more embodiments, the step 445 includes transporting the grease from the grease container 330 to the first one of the metering modules $320_{1-N}$. At a step 450, the controller 180 controls the actuator of the first one of the metering modules $320_{1-N}$ so that a first amount of the delivered grease is metered to a first one of the process valves $310_{1-N}$. In one or more embodiments, the step 450 includes: controlling the actuator of the first one of the metering modules $320_{1-N}$ to start stroking the piston 370; determining how many strokes of the piston 370 are required to meter the first amount to the first one of the process valves $310_{1-N}$; and controlling the actuator to stop stroking the piston 370 when the strokes counted by the cycle counter 420 equal the determined number of strokes required. In one or more embodiments of the step 450, the controller 180 determines the first amount by retrieving data relating to the first one of the process valves $310_{1-N}$ from a database.

At a step 455, grease is delivered to a second one of the metering modules $320_{1-N}$. In one or more embodiments, the step 455 includes transporting the grease from the grease container 330 to the second one of the metering modules $320_{1-N}$. At a step 260, the controller 180 controls the actuator of the second one of the metering modules $320_{1-N}$ so that a second amount of the delivered grease is metered to a second one of the process valves $310_{1-N}$. In one or more embodiments of the step 260, the controller 180 determines the second amount by retrieving data relating to the second one of the process valves $310_{1-N}$ from a database.

In one or more embodiments, among other things, the operation of the grease system 305 and/or the execution of the method 440: ensures that an appropriate amount of grease is injected into each of the process valves $310_{1-N}$ while monitoring the amount of grease injected into each of the process valves $310_{1-N}$; improves the flushing of debris and contaminants from the process valves $310_{1-N}$; improves the performance of the process valves $310_{1-N}$; decreases the risk that a less than adequate amount of grease is injected into the process valves $310_{1-N}$; decreases the risk of malfunction and maintenance needs for the process valves $310_{1-N}$; and/or reduces operators' exposure to oil and gas process units during operation.

Figure 14:
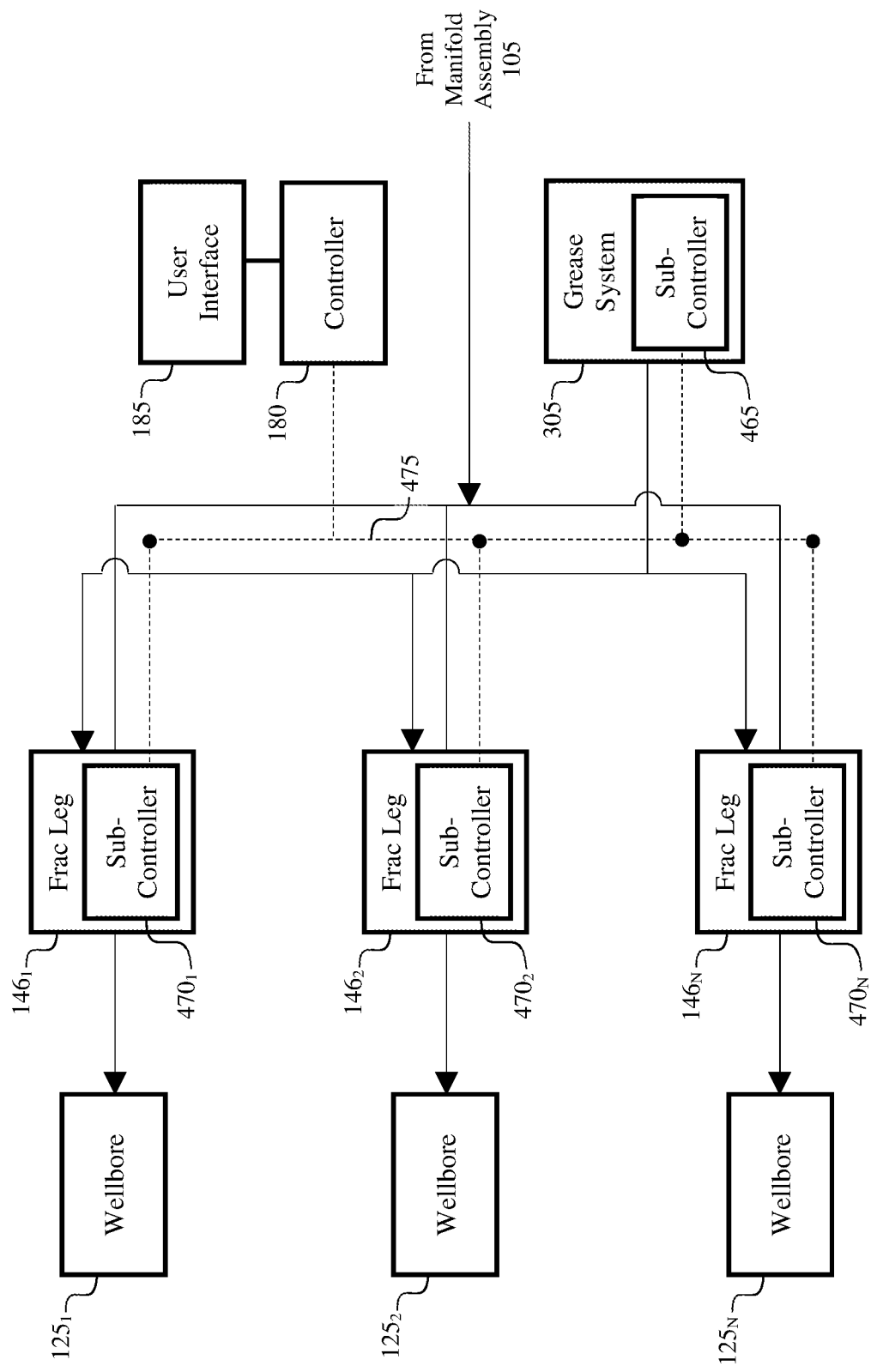
FIG. 14 is a diagrammatic illustration showing part of the system of FIG. 1, according to one or more embodiments.

Referring to FIG. 14, with continuing reference to FIGS. 1-13, in an embodiment, the grease system 305 includes a sub-controller 465 and the frac legs $146_{1-N}$ include sub-controllers $470_{1-N}$, respectively. A communication bus 475 connects the controller 180 to the sub-controllers 465 and $470_{1-N}$. The controller 180 communicates with the sub-controllers 465 and $470_{1-N}$ via the communication bus 475 to coordinate operation of the grease system 305 and the frac legs $146_{1-N}$, as will be described in further detail below.

Figure 15:
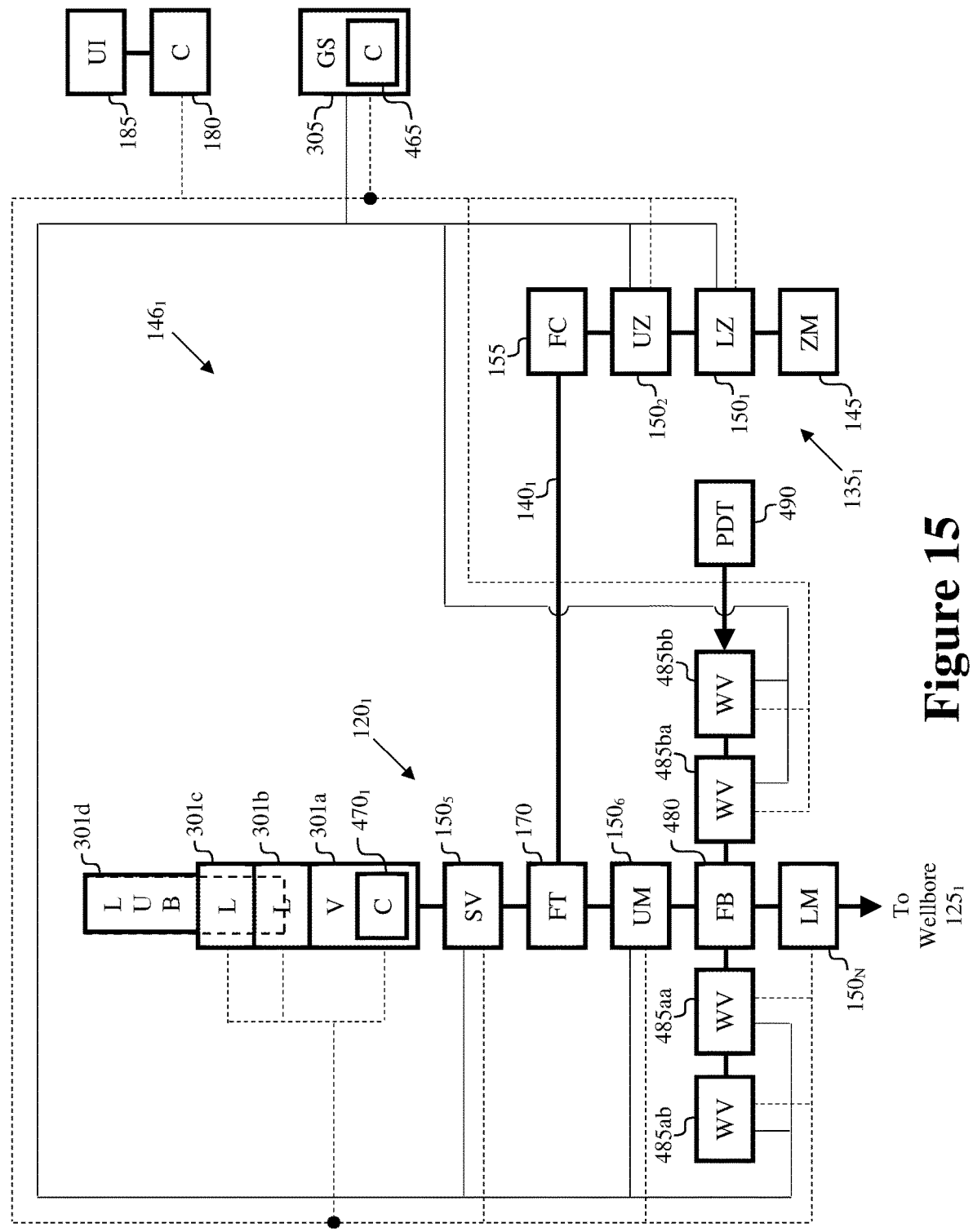
FIG. 15 is a diagrammatic illustration of a frac leg of the system of FIG. 1 performing a step of the method of FIG. 16, namely a perforating operation such as, for example, a ball and sleeve operation, according to one or more embodiments.

Referring to FIG. 15, with continuing reference to FIG. 14, in an embodiment, the sub-controller $470_1$ is part of (or otherwise associated with) the valve 301*a* to thereby control operation of the valve 301*a*, the latch 301*b*, and the launcher 301*d*. The wellhead $120_1$ includes a flow block 480 operably coupled between, and in fluid communication with, the upper master valve $150_6$ and the lower master valve $150_7$. Wing valves 485*aa* and 485*ab* are connected to the flow block 480. Likewise, wing valves 485*ba* and 485*bb* are also connected to the flow block 480, opposite the wing valves 485*aa* and 485*ab*. As a result, in addition to being operably coupled between, and in fluid communication with, the upper master valve $150_6$ and the lower master valve $150_7$, the flow block 480 is operably coupled between, and in fluid communication with, the wing valves 480aa and 480ba. As discussed above in connection with FIGS. 2, 3, and 5, the controller 180 is operably coupled to, and adapted to control actuation of, the lower zipper valve $150_1$, the upper zipper valve $150_2$, the swab valve $150_5$, the upper master valve $150_6$, and the lower master valve $150_N$. Likewise, the controller 180 is operably coupled to, and adapted to control actuation of, the wing valves 185aa, 185ab, 185ba, and 185bb. The manner in which the controller 180 controls actuation of the wing valves 185aa, 185ab, 185ba, and 185bb is similar to the manner in which the controller 180 controls actuation of the lower zipper valve $150_1$, the upper zipper valve $150_2$, the swab valve $150_5$, the upper master valve $150_6$, and the lower master valve $150_N$, as discussed above in connection with FIGS. 2, 3, and 5; therefore, the manner in which the controller controls actuation of the wing valves 185aa, 185ab, 185ba, and 185bb will not be described in further detail. Finally, as in FIG. 15, a pump-down truck 490 may be operably coupled to, and in fluid communication with, the wing valve 485bb.

Figure 16:
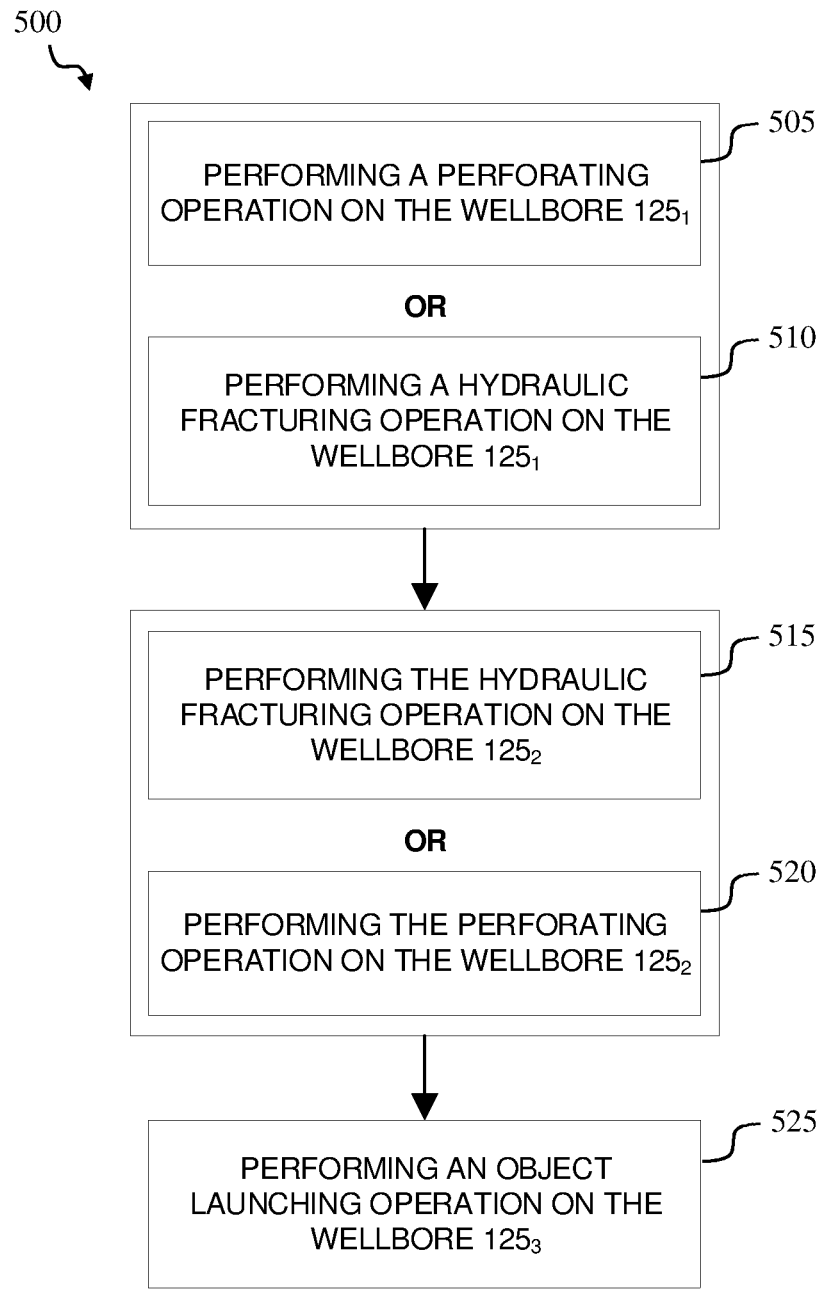
FIG. 16 is a flow diagram of a method for implementing one or more embodiments of the present disclosure.

Referring to FIG. 16, with continuing reference to FIGS. 14 and 15, in an embodiment, a method is generally referred to by the reference numeral 500. The method 500 includes, at a step 505, performing a perforating operation (such as, for example, a ball and sleeve operation) on the wellbore $125_1$. More particularly, turning briefly to FIG. 15, performing the perforating operation on the wellbore $125_1$ includes: deploying a downhole tool (e.g., a plug and perforating gun(s)) on a conveyance string from the lubricator 301d, through the wellhead $120_1$, and into the wellbore $125_1$; pumping the downhole tool into the wellbore $125_1$ using fluid from the pump-down truck 490; perforating the wellbore $125_1$ at a downhole location; and retrieving the downhole to back into the lubricator 301d. In an alternative embodiment, the step 505 is omitted from the method 500, and the method 500 instead includes, at a step 510, performing a second operation (e.g., a hydraulic fracturing operation) on the wellbore $125_1$. The method 500 further includes, at a step 515, performing the second operation on the wellbore $125_2$. More particularly, turning briefly to FIG. 17, performing the second operation on the wellbore $125_2$ includes pumping hydraulic fracturing fluid through the zipper module $135_2$, through the frac line $140_2$, through the wellhead $120_2$, and into the wellbore $125_2$. In an alternative embodiment, the step 515 is omitted from the method 500, and the method 500 instead includes, at a step 520, performing the perforating operation on the wellbore $125_2$. Finally, the method 500 further includes, at a step 525, performing an object launching operation on the wellbore $125_N$ such as, for example, the wellbore $125_3$. More particularly, turning briefly to FIG. 18, performing the object launching operation on the wellbore $125_3$ includes: dropping an object from the launcher 301c, through the valve 301a, through the wellhead $120_3$, and into the wellbore $125_3$; and pumping the object into the wellbore $125_1$ using fluid from the pump-down truck 490.

In some embodiments, the steps 505 or 510, the steps 515 or 520, and/or the step 525 may be executed simultaneously on the wellbores $125_{1-3}$, respectively. In some alternative embodiments, both of the steps 515 and 520 are omitted from the method 500 so that the method 500 includes only the steps 505 and 525, or the steps 510 and 525. In some alternative embodiments, the step 525 is omitted from the method 500 so that the method 500 includes only the steps 505 and 515, the steps 505 and 520, or the steps 510 and 520. In some embodiments, the controller 180 is in communication with additional wellbores such as for example, offset wellbores, wellbores located on difference well pads or different well sites, or the like. In such embodiments, the method 500 can be expanded to include execution of the steps 505 or 510, 515 or 520, and/or 525 on these additional wellbores. In some embodiments, the steps 505, 510, 515, 520, and 525 may be executed on all of the wellbores $125_{1-N}$(and/or the additional wellbores) in order to plug, perforate, and hydraulically fracture the wellbores $125_{1-N}$ (and/or the additional wellbores) using a continuous process.

The step 505 or, alternatively, the step 510, may be executed by communicating, using the controller 180, control signals to the frac leg $146_1$ and the grease system 305. Referring back to FIG. 15, the frac leg $146_1$ includes: the wellhead $120_1$ operably associated with the wellbore $125_1$, the wellhead $120_1$ including one or more first valves (i.e., the swab valve $150_5$, the upper master valve $150_6$, the lower master valve $150_N$, the wing valve 185aa, the wing valve 185ab, the wing valve 185ba, the wing valve 185bb, or a combination thereof); the valve 301a operably coupled to the wellbore $120_1$, opposite the wellbore $125_1$; the frac line $140_1$ operably coupled to the wellhead $120_1$, between the wellbore $125_1$ and the valve 301a; and the zipper module $135_1$ operably coupled to the frac lines $140_1$, opposite the wellhead $120_1$, the zipper module $135_1$ including one or more third valves (i.e., the lower zipper valve $150_1$, the upper zipper valve $150_2$, or both). The frac leg $146_1$ may further include the sub-controller $470_1$, said sub-controller $470_1$ being associated with the valve 301a; in such embodiments, communicating, using the controller 180, the control signals to the frac leg $146_1$ includes communicating at least a portion of the control signals to the sub-controller $470_1$ (via, for example, the communication bus 475).

The grease system 305 is adapted to lubricate the first valve(s) of the wellhead $120_1$ and the third valve(s) of the zipper module $135_1$. The grease system 305 may also include the sub-controller 465; in such embodiments, communicating, using the controller 180, the control signals to the grease system 305 includes communicating at least a portion of the control signals to the sub-controller 465 (via, for example, the communication bus 475). In an alternative embodiment, the grease system 305 is omitted, and the control signals are communicated only to the frac leg $146_1$.

Referring still to FIG. 15, with continuing reference to FIG. 16, in those embodiments of the step 505 in which the control signals are communicated to both the frac leg $146_1$ and the grease system 305, the control signals enable performance of the perforating operation on the wellbore $125_1$ by causing: at least one of the first valve(s) of the wellhead $120_1$ to open; and the grease system 305 to lubricate the at least one of the first valve(s) of the wellhead $120_1$ during and/or after the at least one of the first valve(s) open(s). In such embodiments, the control signals may further enable performance of the perforating operation on the wellbore $125_1$ by causing: at least one of the third valve(s) of the zipper module $135_1$ to close; and the valve 301a to open, allowing passage of a conveyance string carrying a downhole tool through the valve 301a, through the wellhead $120_1$, and into the wellbore $125_1$. Additionally, the frac leg $146_1$ may further include: the lubricator 301d, said downhole tool being deployable from, and retrievable to, the lubricator 301d on the conveyance string; and a latch 301b operably coupled to the valve 301a, opposite the wellhead $120_1$, said latch 301b being adapted to secure the lubricator 301d for deployment and retrieval of the downhole tool. In such embodiments, the control signals may further enable performance of the perforating operation on the wellbore $125_1$ by causing the latch 301b to secure the lubricator 301d for deployment and retrieval of the downhole tool.

In some embodiments, the controller 180 locks at least one of the first valve(s) of the wellhead $120_1$ in the open configuration, the valve 301a in the open configuration (via control signals sent to the sub-controller $470_1$), and/or the at least one of the third valve(s) of the zipper module $135_1$ in the closed configuration when the downhole tool is deployed from the lubricator 301d, and until the downhole tool is retrieved. In such embodiments, this locking may be manually overridden via the user interface 185.

Alternatively, in those embodiments of the step 505 in which the grease system 305 is omitted and the control signals are communicated only to the frac leg $146_1$: the frac leg $146_1$ further includes the sub-controller $470_1$, said sub-controller $470_1$ being associated with the valve 301a; and communicating, using the controller 180, the control signals to the frac leg $146_1$ comprises communicating at least a portion of the control signals to the sub-controller $470_1$. In such embodiments of the step 505, the control signals enable performance of the perforating operation on the wellbore $125_1$ by causing: at least one of the first valve(s) of the wellbore $120_1$ to open; at least one of the third valve(s) of the zipper module $135_1$ to close; and the valve 301a to open, allowing passage of the conveyance string carrying the downhole tool through the valve 301a, through the first one of the wellheads $120_{1-N}$, and into the wellbore $125_1$.

In those embodiments in which the step 510 replaces the step 505 and the control signals are communicated to both the frac leg $146_1$ and the grease system 305, the control signals enable performance of the hydraulic fracturing operation on the wellbore $125_1$ by causing: at least one of the third valve(s) of the zipper module $135_1$ to open; and the grease system 305 to lubricate the at least one of the third valve(s) of the zipper module $135_1$ during and/or after the at least one of the third valve(s) open(s). Additionally, the control signals may further enable performance of the hydraulic fracturing operation on the wellbore $125_1$ by causing the valve 301a to close or remain closed, blocking passage of hydraulic fracturing fluid through the valve 301a.

Alternatively, in those embodiments of the step 510 in which the grease system 305 is omitted and the control signals are communicated only to the frac leg $146_1$: the frac leg $146_1$ further includes the sub-controller $470_1$, said sub-controller $470_1$ being associated with the valve 301a; and communicating, using the controller 180, the control signals to the frac leg $146_1$ comprises communicating at least a portion of the control signals to the sub-controller $470_1$. In such embodiments of the step 510, the control signals enable performance of the hydraulic fracturing operation on the wellbore $125_1$ by causing: at least one of the third valve(s) of the zipper module $135_1$ to open; and the valve 301a to close or remain closed, blocking passage of hydraulic fracturing fluid through the valve 301a.

Figure 17:
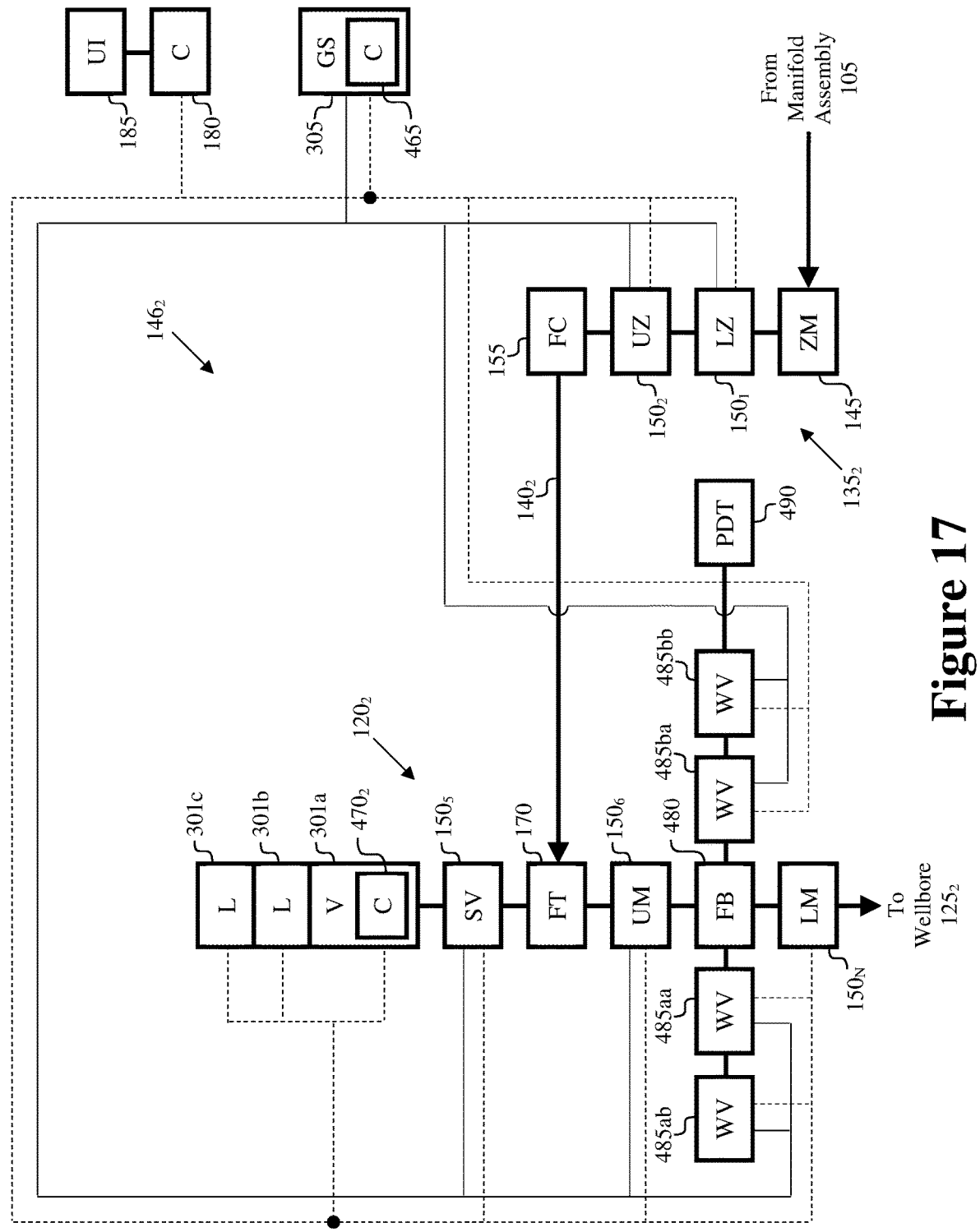
FIG. 17 is a diagrammatic illustration of a frac leg of the system of FIG. 1 performing a step of the method of FIG. 16, namely a hydraulic fracturing operation, according to one or more embodiments.

The step 515 or, alternatively, the step 520, may by executed by communicating, using the controller 180, control signals to the frac leg $146_2$ and the grease system 305. Referring to FIG. 17, the frac leg $146_2$ includes: the wellhead $120_2$ operably associated with the wellbore $125_2$, the wellhead $120_2$ including one or more fourth valves (i.e., the swab valve $150_5$, the upper master valve $150_6$, the lower master valve $150_N$, the wing valve $185aa$, the wing valve $185ab$, the wing valve $185ba$, the wing valve $185bb$, or a combination thereof); the valve 301a operably coupled to the wellhead $120_2$, opposite the wellbore $125_2$; the frac line $140_2$ operably coupled to the wellhead $120_2$, between the wellbore $125_2$ and the valve 301a; and the zipper module $135_2$ operably coupled to the frac line $140_2$, opposite the wellhead $120_2$, the zipper module $135_2$ being in fluid communication with the zipper module $135_1$ and including one or more sixth valves (i.e., the lower zipper valve $150_1$, the upper zipper valve $150_2$, or both). The frac leg $146_2$ may further include the sub-controller $470_2$, said sub-controller $470_2$ being associated with the valve 301a; in such embodiments, communicating, using the controller 180, the control signals to the frac leg $146_2$ includes communicating at least a portion of the control signals to the sub-controller $470_2$ (via, for example, the communication bus 475).

The grease system 305 is adapted to lubricate the fourth valve(s) of the wellhead $120_2$ and the sixth valve(s) of the zipper module $135_2$. As discussed above, the grease system 305 may include the sub-controller 465; in such embodiments, communicating, using the controller 180, the control signals to the grease system 305 includes communicating at least a portion of the control signals to the sub-controller 465 (via, for example, the communication bus 475). Alternatively, the grease system 305 may be omitted, and the control signals may be communicated only to the frac leg $146_2$.

Referring still to FIG. 17, with continuing reference to FIG. 16, in those embodiments of the step 515 in which the control signals are communicated to both the frac legs $146_2$ and the grease system 305, the control signals enable performance of the hydraulic fracturing operation on the wellbore $125_2$ by causing: at least one of the sixth valve(s) of the zipper module $135_2$ to open; and the grease system 305 to lubricate the at least one of the sixth valve(s) of the zipper module $135_2$ during and/or after the at least one of the sixth valve(s) open(s). Additionally, the control signals may further enable performance of the hydraulic fracturing operation on the wellbore $125_2$ by causing the valve 301a to close or remain closed, blocking passage of hydraulic fracturing fluid through the valve 301a.

In some embodiments, the controller 180 locks the at least one of the fourth valve(s) of the wellhead $120_2$ in the open configuration, the valve 301a in the closed configuration (via control signals sent to the sub-controller $470_2$), and/or the at least one of the sixth valve(s) of the zipper module $135_2$ in the open configuration when the hydraulic fracturing fluid is pumped through the zipper module $135_2$, through the frac line $140_2$, through the wellhead $120_2$, and into the wellbore $125_2$, and until such pumping of the hydraulic fracturing fluid is complete. In such embodiments, this locking may be manually overridden via the user interface 185.

Alternatively, in those embodiments of the step 515 in which the grease system 305 is omitted and the control signals are communicated only to the frac leg $146_2$; the frac leg $146_2$ further includes the sub-controller $470_2$, said sub-controller $470_2$ being associated with the valve 301a; and communicating, using the controller 180, the control signals to the frac leg $146_2$ comprises communicating at least a portion of the control signals to the sub-controller $470_2$. In such embodiments of the step 515, the control signals enable performance of the hydraulic fracturing operation on the wellbore $125_2$ by causing: at least one of the sixth valve(s) of the zipper module $135_2$ to open; and the valve 301a to close or remain closed, blocking passage of hydraulic fracturing fluid through the valve 301a.

In those embodiments in which the step 520 replaces the step 515 and the control signals are communicated to both the frac leg $146_2$ and the grease system 305, the control signals enable performance of the perforating operation on the wellbore $125_2$ by causing: at least one of the fourth valve(s) of the wellhead $120_2$ to open; and the grease system 305 to lubricate the at least one of the fourth valve(s) of the wellhead $120_2$ during and/or after the at least one of the fourth valve(s) open(s). In such embodiments, the control signals may further enable performance of the perforating operation on the wellbore $125_2$ by causing: at least one of the sixth valve(s) of the zipper module $135_2$ to close; and the valve 301a to open, allowing passage of a conveyance string carrying a downhole tool through the valve 301a, through the wellhead $120_2$, and into the wellbore $125_2$. Additionally, the frac leg $146_2$ may further include: the lubricator 301d, said downhole tool being deployable from, and retrievable to, the lubricator 301d on the conveyance string; and the latch 301b operably coupled to the valve 301a, opposite the wellhead $120_2$, said latch 301b being adapted to secure the lubricator 301d for deployment and retrieval of the downhole tool. In such embodiments, the control signals may further enable performance of the perforating operation on the wellbore $125_2$ by causing the latch 301b to secure the lubricator 301d for deployment and retrieval of the downhole tool.

Alternatively, in those embodiments of the step 520 in which the grease system 305 is omitted and the control signals are communicated only to the frac leg $146_2$: the frac leg $146_2$ further includes the sub-controller $470_2$, said sub-controller $470_2$ being associated with the valve 301a; and communicating, using the controller 180, the control signals to the frac leg $146_2$ comprises communicating at least a portion of the control signals to the sub-controller $470_2$. In such embodiments of the step 520, the control signals enable performance of the perforating operation on the wellbore $125_2$ by causing: at least one of the fourth valve(s) of the wellhead $120_2$ to open; at least one of the sixth valve(s) of the zipper module $135_2$ to close; and the valve 301a to open, allowing passage of the conveyance string carrying the downhole tool through the valve 301a, through the second one of the wellheads $120_{1-N}$, and into the wellbore $125_2$.

Figure 18:
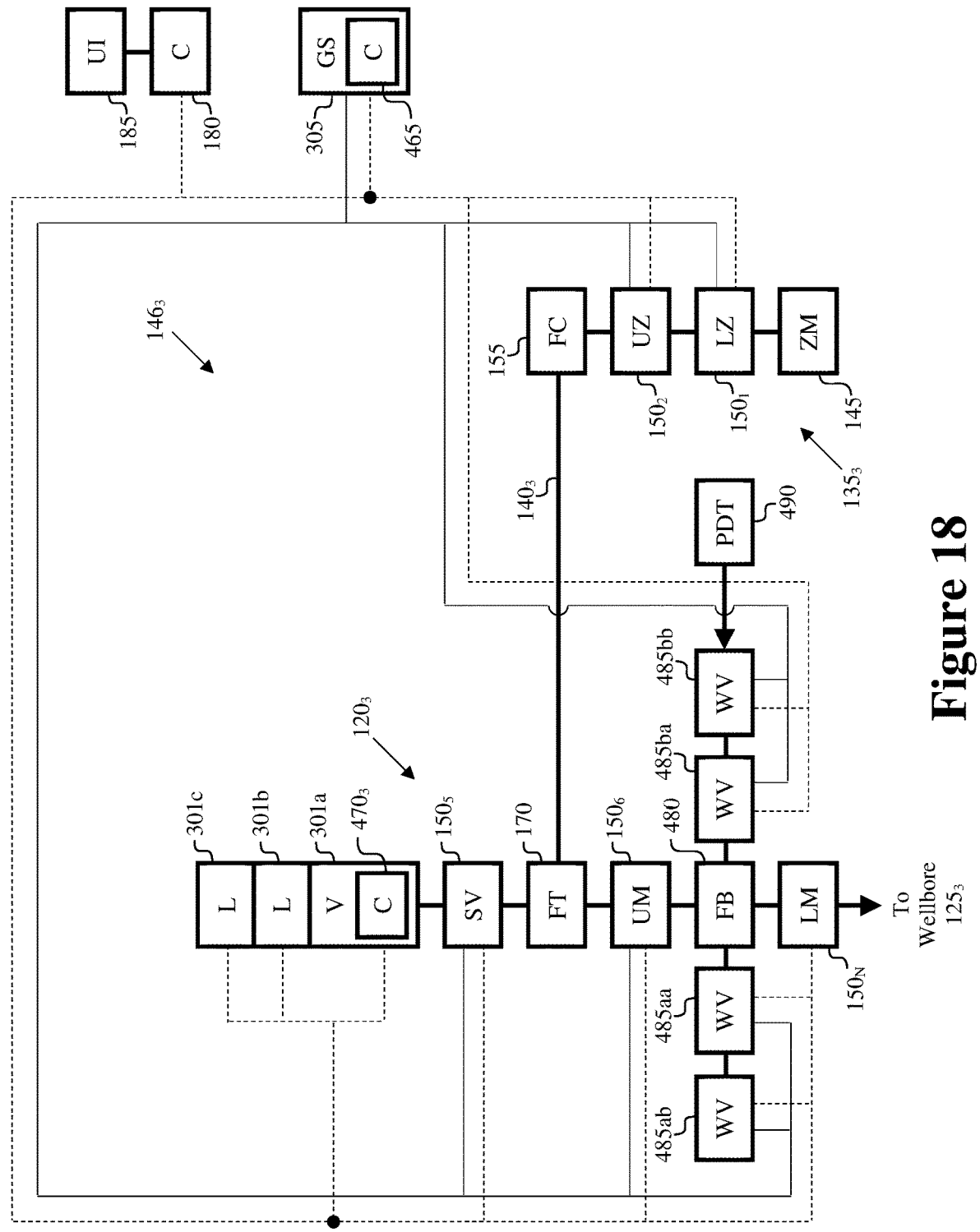
FIG. 18 is a diagrammatic illustration of a frac leg of the system of FIG. 1 performing a step of the method of FIG. 16, namely an object launching operation, according to one or more embodiments.

The step 525 may be executed by communicating, using the controller 180, control signals to the frac leg $146_3$. Turning to FIG. 18, with continuing reference to FIG. 16, the frac leg $146_3$ includes: the wellhead $120_3$ operably associated with the wellbores $120_3$; the valve 301a operably coupled to the wellhead $120_3$, opposite the wellbore $125_3$; and the launcher 301c operably coupled to the valve 301a, opposite the wellhead $120_3$. In such embodiments of the step 525, the control signals enable performance of the object launching operation on the wellbore $125_3$ by causing: the launcher 301c to release an object into the valve 301a; and the valve 301a to allow passage of the released object through the valve 301a, through the wellhead $120_3$, and into the wellbore $125_3$. The frac leg $146_3$ may further include the sub-controller $470_3$, said sub-controller $470_3$ being associated with the valve 301a; in such embodiments, communicating, using the controller 180, the control signals to the frac leg $146_3$ includes communicating at least a portion of the control signals to the sub-controller $470_3$ (via, for example, the communication bus 475).

Figure 19:
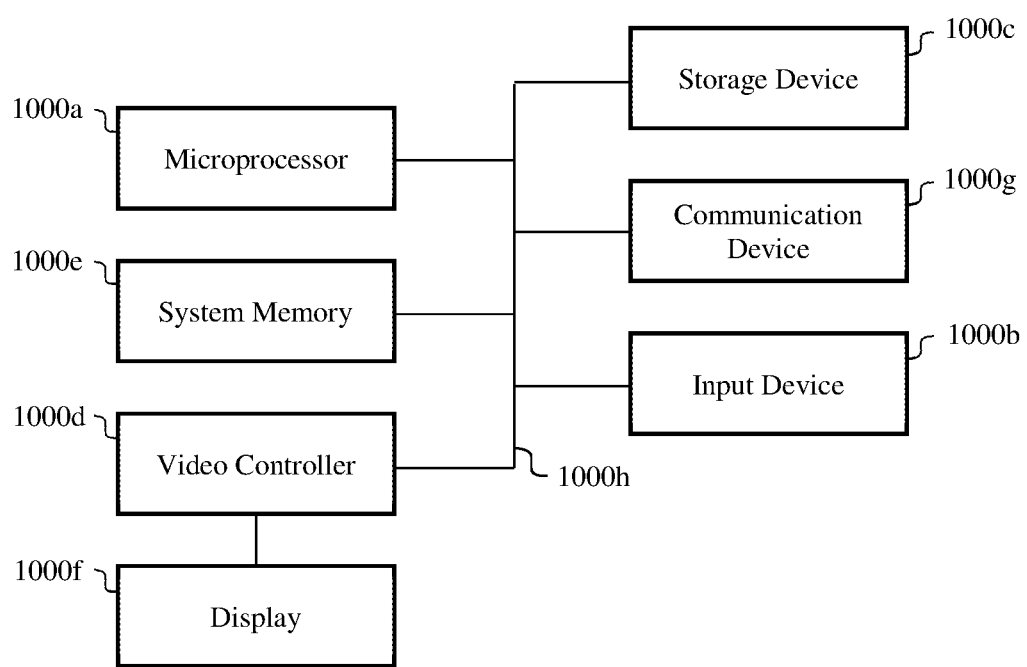
FIG. 19 is a diagrammatic illustration of a computing node for implementing one or more embodiments of the present disclosure.

Referring to FIG. 19, with continuing reference to FIGS. 1-18, in one or more embodiments, a computing node 1000 for implementing one or more embodiments of one or more of the above-described elements, systems, apparatus, controllers, methods, and/or steps, or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In one or more embodiments, the microprocessor 1000a is, includes, or is part of, the controller 180 and/or the one or more other controllers described herein. In one or more embodiments, the storage device 1000c may include a floppy drive, hard drive, CD-ROM, optical drive, any other form of storage device or any combination thereof. In one or more embodiments, the storage device 1000c may include, and/or be capable of receiving, a floppy disk, CD-ROM, DVD-ROM, or any other form of computer-readable medium that may contain executable instructions. In one or more embodiments, the communication device 1000g may include a modem, network card, or any other device to enable the node 1000 to communicate with other nodes. In one or more embodiments, any node represents a plurality of interconnected (whether by intranet or Internet) computer systems, including without limitation, personal computers, mainframes, PDAs, smartphones and cell phones.

In one or more embodiments, one or more of the components of any of the above-described systems include at least the node 1000 and/or components thereof, and/or one or more nodes that are substantially similar to the node 1000 and/or components thereof. In one or more embodiments, one or more of the above-described components of the node 1000 and/or the above-described systems include respective pluralities of same components.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In one or more embodiments, software functions may be directly manufactured into a silicon chip. Accordingly, it should be understood that combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable one or more embodiments of the present disclosure. In one or more embodiments, data structure may provide an organization of data, or an organization of executable code.

In one or more embodiments, any networks and/or one or more portions thereof, may be designed to work on any specific architecture. In one or more embodiments, one or more portions of any networks may be executed on a single computer, local area networks, client-server networks, wide area networks, internets, hand-held and other portable and wireless devices and networks.

In one or more embodiments, database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In one or more embodiments, the data contained in the location of a character file can be mapped to a field in a second table. In one or more embodiments, the physical location of the database is not limiting, and the database may be distributed. In one or more embodiments, the database may exist remotely from the server, and run on a separate platform. In one or more embodiments, the database may be accessible across the Internet. In one or more embodiments, more than one database may be implemented.

In one or more embodiments, a plurality of instructions stored on a computer readable medium may be executed by one or more processors to cause the one or more processors to carry out or implement in whole or in part the above-described operation of each of the above-described elements, systems, apparatus, controllers, methods, and/or steps, or any combination thereof. In one or more embodiments, such a processor may include one or more of the microprocessor 1000a, the controller 180, the one or more other controllers described herein, any processor(s) that are part of the components of the above-described systems, and/or any combination thereof, and such a computer readable medium may be distributed among one or more components of the above-described systems. In one or more embodiments, such a processor may execute the plurality of instructions in connection with a virtual computer system. In one or more embodiments, such a plurality of instructions may communicate directly with the one or more processors, and/or may interact with one or more operating systems, middleware, firmware, other applications, and/or any combination thereof, to cause the one or more processors to execute the instructions.

A system has been disclosed. The system generally includes a first frac leg, the first frac leg including: a first wellhead operably associated with a first wellbore, the first wellhead including one or more first valves and a frac tree; a second valve operably coupled to the first wellhead, opposite the first wellbore; a first frac line operably coupled to the first frac tree; and a first zipper module operably coupled to the first frac line, opposite the first wellhead, the first zipper module including one or more third valves; and a controller that communicates first control signals to the first frac leg; wherein: (a) the first frac leg further includes a first sub-controller, said first sub-controller being associated with the second valve; and the controller communicates the first control signals to the first sub-controller to control operation of the second valve; (b) the system further includes a grease system, which grease system is adapted to lubricate the first valve(s) and/or the third valve(s); the grease system includes a second sub-controller; and the controller communicates second control signals to the second sub-controller to control lubrication of the first valve(s) and/or the third valve(s) by the grease system; or (c) both (a) and (b). In one or more embodiments, (c); the system further includes a communication bus connecting the controller to the first and second sub-controllers; and wherein the controller communicates the first and second control signals to the first and second sub-controllers, respectively, via the communication bus. In one or more embodiments, (a); and wherein the first frac leg further includes: a lubricator from which a downhole tool is deployable, and to which the downhole tool is retrievable, on a conveyance string; and a latch operably coupled to the second valve, opposite the first wellhead, said latch being controllable by the first sub-controller to secure the lubricator for deployment and retrieval of the downhole tool. In one or more embodiments, the system further includes: a second frac leg, the second frac leg including: a second wellhead operably associated with a second wellbore, the second wellhead including one or more fourth valves and a second frac tree; a fifth valve operably coupled to the second wellhead, opposite the second wellbore; a second frac line operably coupled to the second frac tree; and a second zipper module operably coupled to the second frac line, opposite the second wellhead, the second zipper module being in fluid communication with the first zipper module and including one or more sixth valves; wherein the controller communicates third control signals to the second frac leg. In one or more embodiments, (d) the second frac leg further includes a third sub-controller, said third sub-controller being associated with the fifth valve; and the controller communicates the third control signals to the third sub-controller; (e) the system further includes the grease system, which grease system is adapted to lubricate the fourth valve(s) and the sixth valve(s); the grease system includes the second sub-controller; and the controller communicates fourth control signals to the second sub-controller; or (f) both (d) and (e). In one or more embodiments, (a) and (d); the system further includes a communication bus connecting the controller to the first and third sub-controllers; and the controller communicates the first and third control signals to the first and third sub-controllers, respectively, via the communication bus. In one or more embodiments, (d); and the second frac leg further includes: a lubricator from which a downhole tool is deployable, and to which the downhole tool is retrievable, on a conveyance string; and a latch operably coupled to the fifth valve, opposite the second wellhead, said latch being controllable by the third sub-controller to secure the lubricator for deployment and retrieval of the downhole tool. In one or more embodiments, the system further includes: a second frac leg, the second frac leg including: a second wellhead operably associated with a second wellbore; a fifth valve operably coupled to the second wellhead, opposite the second wellbore; and a launcher operably coupled to the fifth valve, opposite the second wellhead; wherein: (d) the second frac leg further includes a third sub-controller, said third sub-controller being associated with the fifth valve and adapted to control the launcher; and the controller communicates the third control signals to the third sub-controller.

The present disclosure also introduces a first method. The first method generally includes: communicating, using a controller, first control signals to: a first frac leg, the first frac leg including: a first wellhead operably associated with a first wellbore, the first wellhead including one or more first valves and a first frac tree; a second valve operably coupled to the first wellhead, opposite the first wellbore; a first frac line operably coupled to the first frac tree; and a first zipper module operably coupled to the first frac line, opposite the first wellhead, the first zipper module including one or more third valves; and a grease system, which grease system is adapted to lubricate the first valve(s) and/or the third valve(s); wherein: (i) the first control signals enable performance of a first operation on the first wellbore by causing: at least one of the first valve(s) to open; and the grease system to lubricate the at least one of the first valve(s) during and/or after the at least one of the first valve(s) open(s); or (ii) the first control signals enable performance of a hydraulic fracturing operation on the first wellbore by causing: at least one of the third valve(s) to open; and the grease system to lubricate the at least one of the third valve(s) during and/or after the at least one of the third valve(s) open(s). In one or more embodiments, (i); the first operation is a perforating operation; and the first control signals further enable performance of the perforating operation of the first wellbore by causing: at least one of the third valve(s) to close; and the second valve to open, allowing passage of a conveyance string carrying a downhole tool through the second valve, through the first wellhead, and into the first wellbore. In one or more embodiments, the first frac leg further includes: a lubricator, said downhole tool being deployable from, and retrievable to, the lubricator on the conveyance string; and a latch operably coupled to the second valve, opposite the first wellhead, said latch being adapted to secure the lubricator for deployment and retrieval of the downhole tool; and the first control signals further enable performance of the perforating operation of the first wellbore by causing: the latch to secure the lubricator for deployment and retrieval of the downhole tool. In one or more embodiments, (ii); the second operation is a hydraulic fracturing operation; and the first control signals further enable performance of the hydraulic fracturing operation on the first wellbore by causing: the second valve to close or remain closed, blocking passage of a hydraulic fracturing fluid through the second valve. In one or more embodiments, (a) the first frac leg further includes a first sub-controller, said first sub-controller being associated with the second valve; and communicating, using the controller, the first control signals to the first frac leg includes: communicating at least a first portion of the first control signals to the first sub-controller; (b) the grease system includes a second sub-controller; and communicating, using the controller, the first control signals to the grease system includes: communicating at least a second portion of the first control signals to the second sub-controller; or (c) both (a) and (b). In one or more embodiments, (c); and the controller communicates at least the first and second portions of the first control signals to the first and second sub-controllers, respectively, via a communication bus. In one or more embodiments, the first method further includes: communicating, using the controller, second control signals to: a second frac leg, the second frac leg including: a second wellhead operably associated with a second wellbore, the second wellhead including one or more fourth valves and a second frac tree; a fifth valve operably coupled to the second wellhead, opposite the second wellbore; a second frac line operably coupled to the second frac tree; and a second zipper module operably coupled to the second frac line, opposite the second wellhead, the second zipper module being in fluid communication with the first zipper module and including one or more sixth valves; and the grease system, which grease system is further adapted to lubricate the fourth valve(s) and the sixth valve(s); wherein: (iii) the second control signals enable performance of the first operation on the second wellbore by causing: at least one of the fourth valve(s) to open; and the grease system to lubricate the at least one of the fourth valve(s) during and/or after the at least one of the fourth valve(s) open(s); or (iv) the second control signals enable performance of the hydraulic fracturing operation on the second wellbore by causing: at least one of the sixth valve(s) to open; and the grease system to lubricate the at least one of the sixth valve(s) during and/or after the at least one of the sixth valve(s) open(s). In one or more embodiments, the first method further includes: communicating, using the controller, second control signals to: a second frac leg, the second frac leg including: a second wellhead operably associated with a second wellbore; a fifth valve operably coupled to the second wellhead, opposite the second wellbore; and a launcher operably coupled to the fifth valve, opposite the second wellhead; wherein: (iii) the second control signals enable performance of an object launching operation on the second wellbore by causing: the launcher to release an object into the fifth valve; and the fifth valve to allow passage of the released object through the fifth valve, through the second wellhead, and into the second wellbore.

Along with the disclosed first method, an accompanying system is also disclosed, the system including a non-transitory computer readable medium and a plurality of instructions stored on the non-transitory computer readable medium and executable by one or more processors, wherein, when the instructions are executed, one or more of the foregoing steps of the first method are executed; additionally, another accompanying system is also disclosed, the system including the controller, the first sub-controller, and the second sub-controller(s), which are used to execute one or more of the foregoing steps of the first method.

The present disclosure also introduces a second method. The second method generally includes: communicating, using a controller, first control signals to: a first frac leg, the first frac leg including: a first wellhead operably associated with a first wellbore, the first wellhead including one or more first valves and a first frac tree; a second valve operably coupled to the first wellhead, opposite the first wellbore; a first frac line operably coupled to the first frac tree; a first zipper module operably coupled to the first frac line, opposite the first wellhead, the first zipper module including one or more third valves; and a first sub-controller, said first sub-controller being associated with the second valve; wherein communicating, using the controller, the first control signals to the first frac leg includes communicating at least a portion of the first control signals to the first sub-controller; and wherein: (i) the first control signals enable performance of a first operation on the first wellbore by causing: at least one of the first valve(s) to open; at least one of the third valve(s) to close; and the second valve to open, allowing passage of a conveyance string carrying a downhole tool through the second valve, through the first wellhead, and into the first wellbore; or (ii) the first control signals enable performance of a hydraulic fracturing operation on the first wellbore by causing: at least one of the third valve(s) to open; and the second valve to close or remain closed, blocking passage of a hydraulic fracturing fluid through the second valve. In one or more embodiments, (i); the first operation is a perforating operation; and the first frac leg further includes: a lubricator, said downhole tool being deployable from, and retrievable to, the lubricator on the conveyance string; and a latch operably coupled to the second valve, opposite the first wellhead, said latch being adapted to secure the lubricator; and the first control signals further enable performance of the perforating operation of the first wellbore by causing: the latch to secure the lubricator for deployment and retrieval of the downhole tool. In one or more embodiments, (ii); and the second operation is a hydraulic fracturing operation. In one or more embodiments, the second method further includes: communicating, using a controller, second control signals to: a second frac leg, the second frac leg including: a second wellhead operably associated with a second wellbore, the second wellhead including one or more fourth valves and a second frac tree; a fifth valve operably coupled to the second wellhead, opposite the second wellbore; a second frac line operably coupled to the second frac tree; a second zipper module operably coupled to the second frac line, opposite the second wellhead, the second zipper module being in fluid communication with the first zipper module and including one or more sixth valves; and a second sub-controller, said second sub-controller being associated with the fifth valve; wherein communicating, using the controller, the second control signals to the second frac leg includes communicating at least a portion of the second control signals to the second sub-controller; and wherein: (iii) the second control signals enable performance of the first operation on the second wellbore by causing: at least one of the fourth valve(s) to open; at least one of the sixth valve(s) to close; and the fifth valve to open, allowing passage of a conveyance string carrying a downhole tool through the fifth valve, through the second wellhead, and into the second wellbore; or (iv) the second control signals enable performance of the hydraulic fracturing operation on the second wellbore by causing: at least one of the sixth valve(s) to open; and the fifth valve to close or remain closed, blocking passage of a hydraulic fracturing fluid through the fifth valve. In one or more embodiments, the second method further includes: communicating, using the controller, second control signals to: a second frac leg, the second frac leg including: a second wellhead operably associated with a second wellbore; a fifth valve operably coupled to the second wellhead, opposite the second wellbore; a launcher operably coupled to the fifth valve, opposite the second wellhead; and a second sub-controller, said second sub-controller being associated with the fifth valve; wherein communicating, using the controller, the second control signals to the second frac leg includes communicating at least a portion of the second control signals to the second sub-controller; and wherein: (iii) the second control signals enable performance of an object launching operation on the second wellbore by causing: the launcher to release an object into the fifth valve; and the fifth valve to allow passage of the released object through the fifth valve, through the second wellhead, and into the second wellbore.

Along with the disclosed second method, an accompanying system is also disclosed, the system including a non-transitory computer readable medium and a plurality of instructions stored on the non-transitory computer readable medium and executable by one or more processors, wherein, when the instructions are executed, one or more of the foregoing steps of the second method are executed; additionally, another accompanying system is also disclosed, the system including the controller, the first sub-controller, and the second sub-controller(s), which are used to execute one or more of the foregoing steps of the second method.

It is understood that variations may be made in the foregoing without departing from the scope of the present disclosure.

In one or more embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes, and/or procedures may be merged into one or more steps, processes and/or procedures.

In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A system for one or more wellheads, the one or more wellheads comprising:
a first wellhead operably associated with a first wellbore, the first wellhead comprising one or more first wellhead valves and a frac tree operably coupled to the one or more first wellhead valves, opposite the first wellbore;
the system comprising:
a first controller adapted to control a first valve apparatus to pass a downhole tool and/or another object through the first valve apparatus and into the first wellhead;
the first valve apparatus, which is adapted to be operably coupled to the first wellhead, opposite the first wellbore, and is further adapted to be operably coupled to a latch configured to secure a lubricator for deployment and retrieval of the downhole tool on a conveyance string, the first valve apparatus comprising:
an operating volume; and a valve openable to permit fluid communication between the operating volume and the first wellhead, and closeable to at least partially fluidically isolate the operating volume from the first wellhead; and a conduit adapted to be operably coupled to the first valve apparatus between the valve and the latch, and via which the operating volume is pressurizable to facilitate passage of the downhole tool and/or the another object through the first valve apparatus and into the first wellhead.

2. The system of claim 1,
wherein the first valve apparatus if further adapted to be operably coupled to a launcher configured to release the another object into the first valve apparatus.

3. The system of claim 1, the one or more wellheads further comprising:
a second wellhead operably associated with a second wellbore, the second wellhead comprising one or more second wellhead valves;
the system further comprising:
a second controller adapted to control a second valve apparatus;
the second valve apparatus, which is adapted to be operably coupled to the second wellhead, opposite the second wellbore; and
a communication bus connecting the first and second controllers.

4. The system of claim 1, further comprising:
a second controller adapted to control a grease meter to lubricate the one or more first wellhead valves;
the grease meter, which is adapted to be operably coupled to the one or more first wellhead valves; and
a communication bus connecting the first and second controllers.

5. The system of claim 1, further comprising:
a frac line operably coupled to the frac tree; and
a zipper module operably coupled to the frac line opposite the first wellhead, the zipper module comprising one or more zipper valves.

6. The system of claim 5, further comprising:
a second controller adapted to control a grease meter to lubricate the one or more zipper valves;
the grease meter, which is adapted to be operably coupled to the one or more zipper valves; and
a communication bus connecting the first and second controllers.

7. The system of claim 1, wherein:
the first controller is a first sub-controller; and
the system further comprises a second controller that communicates control signals to the first sub-controller.

8. The system of claim 1, wherein the first valve apparatus further comprises another valve openable to permit fluid communication with the operating volume, and closeable to prevent, or at least reduce, said fluid communication.

9. The system of claim 8, wherein the another valve is openable to permit fluid communication between the operating volume and the latch, and closeable to at least partially fluidically isolate the operating volume from the latch.

10. The system of claim 8, wherein the another valve is openable to permit fluid communication between the operating volume and the conduit, and closeable to at least partially fluidically isolate the operating volume from the conduit.

11. A method, comprising:
controlling, using a first controller, a first valve apparatus to pass a downhole tool and/or another object through the first valve apparatus and into a first wellhead, the first valve apparatus being operably coupled to:
the first wellhead, opposite a first wellbore, the first wellhead comprising one or more first wellhead valves and a frac tree operably coupled to the one or more first wellhead valves, opposite the first wellbore; and
a latch configured to secure a lubricator for deployment and retrieval of the downhole tool on a conveyance string;
wherein the first valve apparatus comprises:
an operating volume; and
a valve openable to permit fluid communication between the operating volume and the first wellhead, and closeable to at least partially fluidically isolate the operating volume from the first wellhead; and
wherein controlling the first valve apparatus to pass the downhole tool and/or the another object through the first valve apparatus and into the first wellhead comprises pressurizing the operating volume via a conduit operably coupled to the first valve apparatus between the valve and the latch.

12. The method of claim 11,
wherein the first valve apparatus is further operably coupled to a launcher configured to release the another object into the first valve apparatus.

13. The method of claim 11, wherein:
the first controller is connected to a second controller via a communication bus; and
the method further comprises controlling, using the second controller, a second valve apparatus operably coupled to a second wellhead, opposite a second wellbore, the second wellhead comprising one or more second wellhead valves.

14. The method of claim 11, wherein:
the first controller is connected to a second controller via a communication bus; and
the method further comprises controlling, using the second controller, a grease meter operably coupled to the one or more first wellhead valves to lubricate the one or more first wellhead valves.

15. The method of claim 11, wherein:
the first controller is connected to a second controller via a communication bus; and
the method further comprises controlling, using the second controller, a grease meter coupled to one or more zipper valves of a zipper module to lubricate the one or more zipper valves, the zipper module being operably coupled to a frac line, the frac line being operably coupled to the frac tree.

16. The method of claim 11, wherein:
the first controller is a first sub-controller; and
the method further comprises communicating, using a second controller, control signals to the first sub-controller.

17. The method of claim 11, wherein the first valve apparatus further comprises another valve openable to permit fluid communication with the operating volume, and closeable to prevent, or at least reduce, said fluid communication.

18. The method of claim 17, wherein the another valve is openable to permit fluid communication between the operating volume and the latch, and closeable to at least partially fluidically isolate the operating volume from the latch.

19. The method of claim 17, wherein the another valve is openable to permit fluid communication between the operating volume and the conduit, and closeable to at least partially fluidically isolate the operating volume from the conduit.

20. An apparatus, comprising:
a non-transitory computer readable medium; and
a plurality of instructions stored on the non-transitory computer readable medium and executable by one or more processors, wherein, when the instructions are executed by the one or more processors, the following steps are executed:
controlling, using a first controller, a first valve apparatus to pass a downhole tool and/or another object through the first valve apparatus and into a first wellhead, the first valve apparatus being operably coupled to:
the first wellhead, opposite a first wellbore, the first wellhead comprising one or more first wellhead valves and a frac tree operably coupled to the one or more first wellhead valves, opposite the first wellbore; and
a latch configured to secure a lubricator for deployment and retrieval of the downhole tool on a conveyance string;
wherein the first valve comprises:
an operating volume; and
a valve openable to permit fluid communication between the operating volume and the first wellhead, and closeable to at least partially fluidically isolate the operating volume from the first wellhead;
and
wherein controlling the first valve apparatus to pass the downhole tool and/or the another object through the first valve apparatus and into the first wellhead comprises pressurizing the operating volume via a conduit operably coupled to the first valve apparatus between the valve and the latch.

21. The apparatus of claim 20,
wherein the first valve apparatus is further operably coupled to a launcher configured to release the another object into the first valve apparatus.

22. The apparatus of claim 20, wherein:
the first controller is connected to a second controller via a communication bus; and
when the instructions are executed by the one or more processors, the following step is also executed:
controlling, using the second controller, a second valve apparatus operably coupled to a second wellhead, opposite a second wellbore, the second wellhead comprising one or more second wellhead valves.

23. The apparatus of claim 20, wherein:
the first controller is connected to a second controller via a communication bus; and
when the instructions are executed by the one or more processors, the following step is also executed:
controlling, using the second controller, a grease meter operably coupled to the one or more first wellhead valves to lubricate the one or more first wellhead valves.

24. The apparatus of claim 20, wherein:
the first controller is connected to a second controller via a communication bus; and
when the instructions are executed by the one or more processors, the following step is also executed:
controlling, using the second controller, a grease meter coupled to one or more zipper valves of a zipper module to lubricate the one or more zipper valves, the zipper module being operably coupled to a frac line, the frac line being operably coupled to the frac tree.

25. The apparatus of claim 20, wherein:
the first controller is a first sub-controller; and
when the instructions are executed by the one or more processors, the following step is also executed:
communicating, using a second controller, control signals to the first sub-controller.

26. The apparatus of claim 20, wherein the first valve apparatus further comprises another valve openable to permit fluid communication with the operating volume, and closeable to prevent, or at least reduce, said fluid communication.

27. The apparatus of claim 26, wherein the another valve is openable to permit fluid communication between the operating volume and the latch, and closeable to at least partially fluidically isolate the operating volume from the latch.

28. The apparatus of claim 26, wherein the another valve is openable to permit fluid communication between the operating volume and the conduit, and closeable to at least partially fluidically isolate the operating volume from the conduit.

* * * * *